(12) United States Patent
Chandrasekaran et al.

(10) Patent No.: US 7,107,319 B2
(45) Date of Patent: Sep. 12, 2006

(54) METHOD AND APPARATUS FOR REDUCING LATENCY AND MESSAGE TRAFFIC DURING DATA AND LOCK TRANSFER IN A MULTI-NODE SYSTEM

(75) Inventors: Sashikanth Chandrasekaran, Belmont, CA (US); David Brower, Alamo, CA (US); Roger J. Bamford, Woodside, CA (US)

(73) Assignee: Oracle Corporation, Redwood Shores, CA (US)

( * ) Notice: Subject to any disclaimer, the term of this patent is extended or adjusted under 35 U.S.C. 154(b) by 531 days.

(21) Appl. No.: 09/871,853

(22) Filed: May 31, 2001

(65) Prior Publication Data

US 2002/0184216 A1 Dec. 5, 2002

(51) Int. Cl.
*G06F 12/00* (2006.01)
*G06F 9/00* (2006.01)
(52) U.S. Cl. ............... 709/213; 709/203; 709/232; 709/235; 711/147; 711/151; 711/150; 707/8
(58) Field of Classification Search ........... 709/213, 709/203, 232, 235; 707/8; 711/147, 151, 711/150, 154
See application file for complete search history.

(56) References Cited

U.S. PATENT DOCUMENTS

| 5,285,528 | A | 2/1994 | Hart |
| 5,454,108 | A | 9/1995 | Devarakonda et al. |
| 5,566,319 | A | 10/1996 | Lenz |
| 5,596,754 | A | 1/1997 | Lomet |
| 6,353,836 | B1 | 3/2002 | Bamford et al. |
| 6,453,404 | B1 | 9/2002 | Bereznyi et al. |
| 6,587,921 | B1 * | 7/2003 | Chiu et al. ............ 711/119 |
| 6,668,295 | B1 | 12/2003 | Chan |
| 2004/0225742 | A1 | 11/2004 | Loaiza et al. |
| 2005/0149540 | A1 | 7/2005 | Chan et al. |

FOREIGN PATENT DOCUMENTS

WO WO 91/03024 3/1991

OTHER PUBLICATIONS

Crispin Cowan et al., "Formal Semantics for Expressing Optimism: The Meaning of HOPE," May 19, 1995, XP 000643142, pp. 164-173.

(Continued)

*Primary Examiner*—Kimberly McLean-Mayo
(74) *Attorney, Agent, or Firm*—Hickman Palermo Truong & Becker LLP; Christopher J. Brokaw

(57) ABSTRACT

A method and apparatus are provided for improving the performance associated with transferring a data item and obtaining a lock in a multi-node system by interpreting the block transfer message as a lock grant message. Typically when a Holder of a data item transfers a data item (e.g. block) to a Requestor of that data item, the Holder will down-convert its lock for that data item and send a message to the Master of this data item indicating that a down-convert has been performed. Subsequently, the Master sends a lock grant message to the Requestor of the data item to inform the Requestor that it has been granted a lock for the data item. By interpreting the block transfer message as a lock grant message, the down-convert message and the lock grant message can be eliminated, which results in improved performance.

41 Claims, 23 Drawing Sheets

OTHER PUBLICATIONS

Written Opinion from PCT Patent Application No. PCT/US02/06981 dated Oct. 3, 2004(8 pgs.).
Current Claims in PCT Patent Application No. PCT/US02/06981 (8 pgs.).
Office Action from Canadian Patent Application No. 2,448,050 dated Oct. 1, 2004 (2 pgs).
Current Claims in Canadian Patent Application No. 2, 448,050 (48 pgs).
State Intellectual Property Office of P.R.C., Patent Application No. 02811032.3, Notification of the First Office Action, dated Apr. 1, 2005, 5 pages.
Current Claims in PCT Patent Application No. 02811032.3 (28 pgs.).
U.S. Appl. No. 10/056,716, filed Jan. 22, 2002.
U.S. Appl. No. 10/091,618, filed Mar. 4, 2002.

* cited by examiner

METHOD AND APPARATUS FOR REDUCING LATENCY AND MESSAGE TRAFFIC DURING DATA AND LOCK TRANSFER IN A MULTI-NODE SYSTEM

FIELD OF THE INVENTION

The present invention relates to techniques for reducing the latency and message traffic associated with one entity requesting a data item, and the lock associated with this data item, from another entity.

BACKGROUND OF THE INVENTION

To improve scalability, some database and file systems permit more than one database or file server (each running separately) to concurrently access shared storage such as disk media. Each database or file server has a cache for caching shared data items, such as disk blocks. Such multi-node systems are referred to herein as clusters. One problem associated with a cluster is the overhead associated with obtaining a data item and the lock associated with this data item.

The entities that desire access to a data item are referred to herein as "Requestors" for the data item. The one or more entities that currently hold the rights to access the data item are referred to herein as the Holders of the data item. The entity that is responsible for keeping track of the locks that are associated with the data item, for all the nodes in a cluster, is referred to herein as the Master of the data item. The Master, Holder(s), and Requestor(s) of a data item may be separate processes on a single node, processes on separate nodes, or some may be processes on the same node with others on separate nodes.

In a typical scenario, a Holder holds the most recent version of a data item in its cache. The Requestor requests some level of access, and hence a lock, on the data item. The type of lock that a Requestor requires depends on the type of access the Requestor wishes to perform. Thus, lock requests typically specify the "lock mode" of the lock that is desired. Consequently, obtaining a particular type of lock may also be called "obtaining a lock in a particular mode". For example, in order to read a data item, an S lock (e.g. share lock) must be obtained. In order to modify a data item, an X lock (e.g. exclusive lock) must be obtained. In order for an X lock to be held, no other Holders may hold any other locks. However, several Holders may hold S locks concurrently.

Various messages must be exchanged for a Requestor to obtain a data item and a lock associated with this data item. Referring to FIGS. 1A and 1B, FIG. 1A is a block diagram portraying a cluster where a Master 100, a Holder 110 and a Requestor 120 are on separate nodes. Furthermore the Requestor 120 needs an S lock and the Holder 110 already has an X lock. FIG. 1B shows a script of messages, which would be used by the scenario depicted in FIG. 1A. FIG. 1B also shows the parameters, which would be associated with these messages.

More than likely, the connection between the Holder 110 on Node A and the Requestor 120 on Node B is a high speed connection. The connection between the Requestor 120 on Node B and the Master 100 on Node C is a slower connection.

Initially, the Holder 110 has a data item and an X lock for this data item. Subsequently a Requestor 120 needs access to this data item and an S lock for it. In order to request access to the data item and to obtain an S lock for this data item, the Requestor 120 on Node B sends an lock request message to the Master 100 on Node C. Associated with the lock request message is a memory location into which the requested data item will ultimately be transferred and a desired lock mode, which indicates that the Requestor 120 needs an S lock.

When the Master 100 receives the lock request message, the Master 100 sends a message to the Holder 110 on Node A to inform the Holder 110 (e.g. inform lock holder) that there is a Requestor 120 that needs the data item in share mode.

The Holder 110 will transfer the requested data item to the Requestor's specified memory location. The Holder 110 performs a memory-to-memory transfer to transfer the data item to the Requestor 120. In addition, the Holder 110 on Node A will down-convert its lock from an X lock to an S lock and notify the Master 100 of this down conversion. The transfer of the requested data item (e.g. TBM) and the down-convert message maybe sent in parallel.

When the Master 100 receives the down-convert message, Master 100 grants the Requestor 120 on Node B an S lock by sending the Requestor 120 a lock grant message. Only after Requestor 120 receives the lock grant message may Requestor 120 access the data item.

In this scenario, latency, or time from initial request (e.g. LRM) to time when the data item can be used (e.g. Requestor 120 receives the lock grant message), is four small messages (e.g. lock request message, inform lock holder, down-convert message, and lock grant message). The traffic is four small messages (lock request message, inform lock holder, down-convert message, and lock grant message) and one transfer of the requested data item.

To increase the speed of operations in the cluster, it is desirable to provide techniques that reduce the amount of time that Requestors must wait before they can access the data items they request.

SUMMARY OF THE INVENTION

A method and apparatus are provided for improving the performance associated with transferring a data item and obtaining a lock in a multi-node system. The techniques described are applicable in any context in which entities that have caches share access to resources. Such contexts include, but are not limited to file systems and database systems. According to one aspect of the invention, increased performance is achieved by causing Requestors to interpret the block transfer message as a lock grant message. Thus, the Requestor may access the data item as soon as it is received without having to wait for the explicit lock grant from the Master.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

Figure 1A:
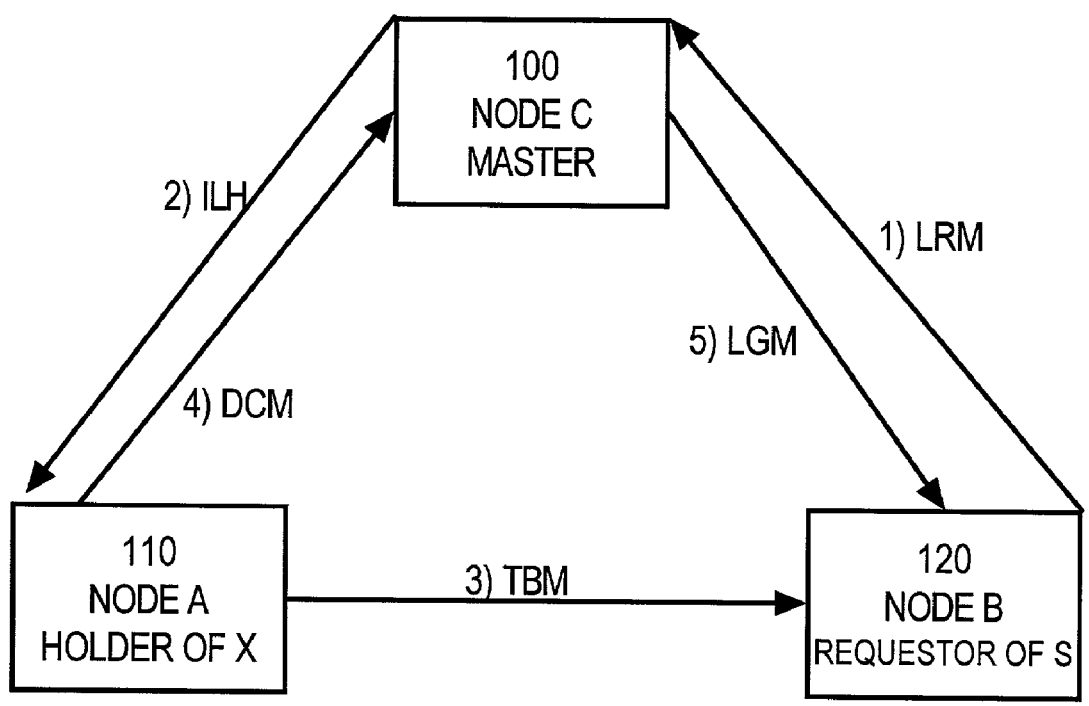
FIG. 1A is a block diagram illustrating a cache-to-cache transfer of the most recent version of a data item and a lock associated with this data item.
Figure 1B:
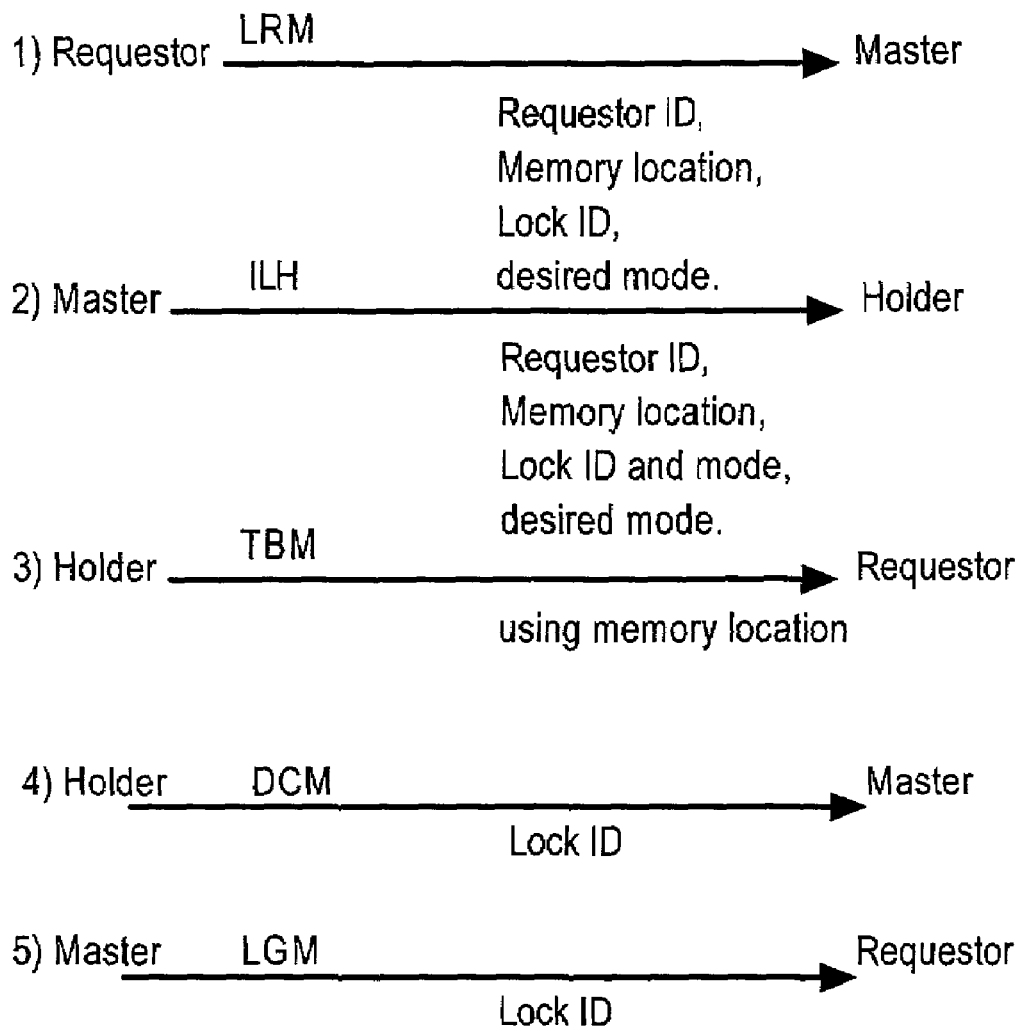
FIG. 1B is a message script, which corresponds to FIG. 1A.

A method and apparatus for improving the performance associated with transferring a block (e.g. data item) and obtaining a lock in a cluster by interpreting the block transfer message as a lock grant message is described herein. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The techniques described hereafter are applicable in any context in which entities that have caches share access to resources. Such contexts include, but are not limited to file systems and database systems. When used in the context of file systems, the file system blocks may not have redundant fields in the data item headers as described hereinafter in the discussion of the Transfer Block Message under Terminology. Instead of using redundant fields in the data item header, the new lock mode and role can be placed in a header location that is separate from the data location. Furthermore, the request memory address must include the header and data location. The header and data can be sent through scatter/gather operations in the interconnect.

Terminology

The following terms will be used to refer to the messages that are exchanged in the many scenarios presented herein to describe embodiments of the invention:

1) Lock Request Message (LRM):

The Requestor sends an LRM to the Master. In some systems, the Requestor may include in the LRM a memory location into which the data item is to be copied.

2) Inform Lock Holders Message (ILH):

The Master sends an ILH to the Holder to inform the Holder that there is a Requestor that is interested in obtaining a lock for the data item (i.e. desires to access the data item). The ILH may be sent to many Holders that hold S locks on a data item if the Requestor desires an exclusive lock.

3) Transfer Block Message (TBM):

The Holder transfers the data item (e.g. block), which is in the Holder's cache, to the Requestor with a TBM. Receipt of the Transfer Block Message is interpreted by the requestor as a lock grant from the Holder of the data item.

Not only does TBM include the contents of the data item but also the Holder's lock state information. The lock state information can simply consist of the lock mode. In some systems, lock state information may additionally contain the version numbers of the data item that is retained in the holder's cache or some indication of which node sent the data item. One technique of sending information associated with the data item is to store this information in redundant fields in the data item's header. Data item header fields are considered "redundant" if the requesting node can reconstruct these "redundant" fields after receiving the data item. Examples of redundant fields are the database block address and the database block type.

A second technique for sending information associated with a data item is to use "scatter/gather" techniques to send separate header and payload fields in a single underlying message. For example, a typical write/send operation may be performed by making a call such as:

send(some_dest, some_buffer, buffer_length);

A vector send/write takes an array or list of buffers and puts them in one operation, something like the following:

v[0].buf=buf1;
v[0].len =buflen1;
v[1].buf =buf2;
v[1].len =buflen2;
vsend(some_dest, 2/* size of vector */, v);

while a receive/read would be the following:

v[0].buf =buf1;
v[0].len =buflen1;
v[1].buf=buf2;
v[1].len =buflen2;
vread(some_dest, 2, v);

The usual way these operations are used is to separate header information from payload. In the example given for file system, the lock message information would be buf1, and the actual block would be in buf2. Describing both operations in the API allows the underlying system to turn what appears to be two operations into a single operation. If this technique is used in a messaging system, the result is one message on the wire, which is a big advantage.

A third technique for sending information associated with a data item is to send a separate status message (e.g. LSM) containing the lock state information instead of including the lock state information with the TBM; however, sending a separate status message may decrease the usefulness of the protocol unless the system allows for sending a separate LSM and a separate TBM through a "vector" send in parallel. In such a system that supports "vector" send in parallel, a separate LSM will not reduce the efficiency of the protocol.

4) Broadcast Inform Lock Holders Message (BILH):

The Master sends a BILH to all of the shared lock Holders (e.g. all the Holders of share locks for a particular data item), except one Holder, to inform the share lock Holders that a Requestor is interested in obtaining a lock for a data item, which the share lock Holders currently hold shared locks on.

5) Down-Convert Message (DCM):

The Holder down-converts its lock (for example, from exclusive mode to share mode) and informs the Master that the lock has been down-converted by sending a DCM to the Master.

6) Update Lock Mode (ULM):

When more than one Holder needs to inform the Master that they have changed/updated their lock mode in response to a request for a data item. The Holders send ULMs to the master along with the lock id and new lock mode associated with this lock id.

7) Lock Grant Message (LGM):

The Master sends a LGM to the Requestor to inform the Requestor that the lock has been granted to the Requestor.

8) Lock Status Message (LSM):

When two entities (e.g. Master, Requestor(s), Holder(s)) realize that their respective lock statuses do not match, the two entities will exchange statuses with the LSM. For example, when the Master receives a LRM, which includes lock status, from a Holder and the lock status from this Holder does not match the lock status that the Master has, the Master will send a LSM to the Holder with the Master's lock status. Then the Holder will send back to the Master a LSM, which will include the lock status, as the Holder knows it. Thus, the Master and Holder can resynchronize their lock status for a particular data item.

Lock Assume Message

As stated before, typically when a Holder of a data item transfers the data item to a Requestor of that data item, the Holder will down-convert its lock for that data item and send a message to the Master of this data item indicating that a down-convert has been performed. Subsequently, the Master sends a lock grant message to the Requestor of the data item to inform the Requestor that the Requestor has been granted a lock for the data item.

In contrast, techniques are provided in which Requestors do not wait for a lock grant message from the Master. Rather, Requestors interpret receipt of the data item from the Holder as an implicit lock grant message. By the Requestor interpreting the block transfer message as a lock grant message, the down-convert message and the lock grant message can be eliminated, which results in improved performance.

Ultimately the Master of a data item must be informed about what entities hold locks on the data item. In embodiments in which Holders do not send down-convert messages to the Master, the Master must obtain this information through some other mechanism. According to one embodiment, in order for the Master to know that the Holder has already down-converted its lock mode and that the Requestor has assumed the new lock mode, either the Requestor or the Holder sends a Lock Assume Message (LAM) to the Master.

Functional Overview

Figure 2A:
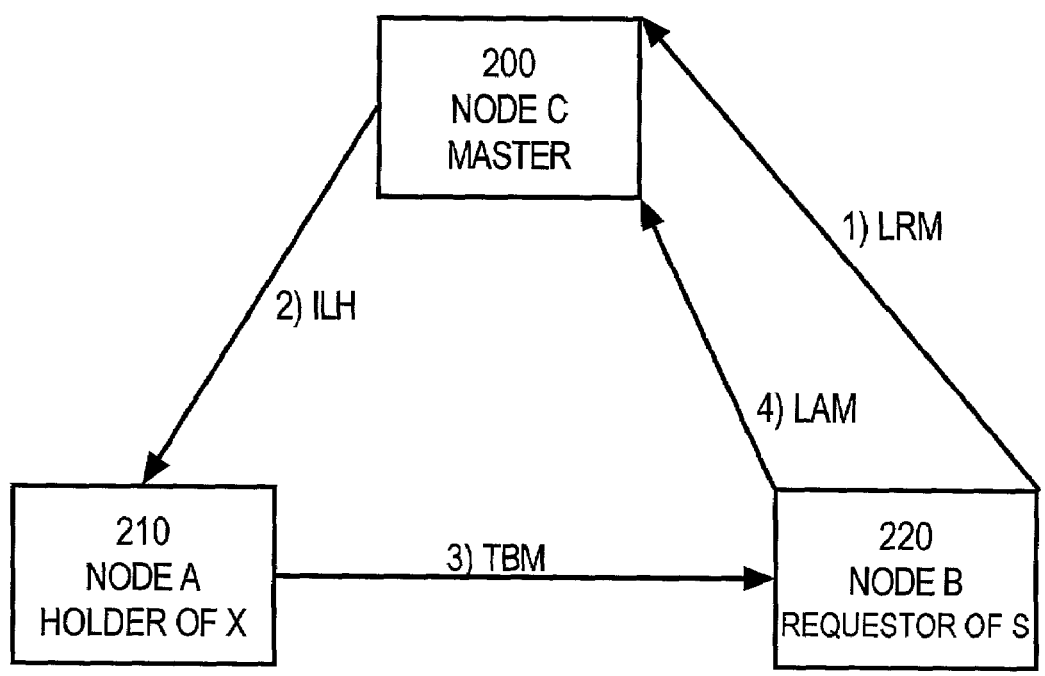
FIG. 2A is a block diagram illustrating the Master, Holder, and Requestor on separate nodes in a cluster.
Figure 2B:
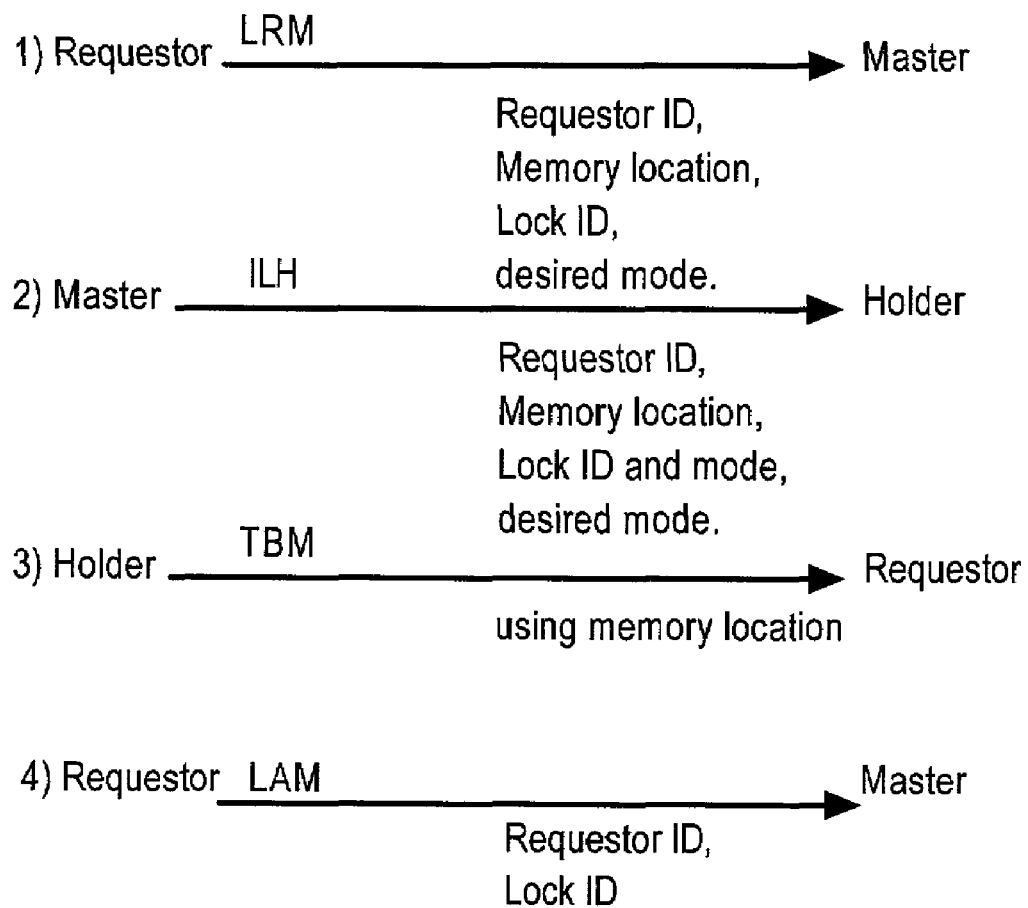
FIG. 2B is a message script, which corresponds to FIG. 2A.

FIG. 2A is a block diagram portraying a cluster where the Master 200, Holder 210 and Requestor 220 are on separate nodes in a cluster. Furthermore the Requestor 220 needs an S lock and the Holder 210 already has an X lock. FIG. 2B shows a script of messages that would be used by the scenario depicted in FIG. 2A. FIG. 2B also shows the parameters that would be associated with these messages.

The Holder 210 currently has a data item and an X lock for this data item. Requestor 220 needs access to this data item and an S lock for it. The following steps are executed so that the Requestor 220 can gain access to this data item in S mode:

1) Requestor Sends LRM to Master:

In order to request access to the data item and to obtain an S lock for this data item, the Requestor 220 sends an LRM to the Master 200. Associated with the LRM is a memory location into which the requested data item will ultimately be transferred and a desired lock mode, which indicates that the Requestor 220 needs an S lock.

2) Master Sends ILH to Holder:

When the Master 200 receives the LRM, the Master 200 sends an ILH to the Holder 210 to inform the Holder 210 that there is a Requestor 220 that needs the data item in share mode.

3) Holder Sends TBM to Requestor:

The Holder 210 will transfer the requested data item with a TBM using the Requestor's memory location (box 220). The Holder 210 performs a memory-to-memory transfer to transfer the data item to the Requestor 220.

The Requestor 220 of the S lock interprets receipt of the data item as a lock grant, thus eliminating the need to wait for the LGM and DCM. Furthermore since the Holder 210 has an X lock and no other Holder may hold any other locks at the same time that an X lock is being held, the Holder 210 will down-convert its lock from an X lock to an S lock upon transferring the data item. According to one embodiment, this down-convert is performed by changing lock information maintained locally on Holder 210, but Holder 210 does not notify the Master 200 of this down conversion with a DCM.

4) Requestor Sends LAM to Master:

The Requestor 220 sends a LAM to the Master 200 indicating that the Requestor 220 has assumed an S lock for the data item that was transferred by the Holder 210. In response to the LAM, the Master 200 revises its lock information for the data item to indicate that both Requestor 220 and Holder 210 have S locks on the data item. According to another embodiment of this invention instead of the Requestor 220 sending a LAM to the Master 200, the Holder 210 could send the LAM to the Master 200 concurrently to sending a TBM to Requestor 220.

More than likely, the connection between the Holder 210 on Node A and the Requestor 220 on Node B is a high speed connection. The connection between the Requestor 220 on Node B and the Master 200 on Node C is a slower connection. Assume that this configuration is true for all of the scenarios described herein.

In this scenario the latency, or time from initial request (e.g. LRM) to time when the data item can be used (e.g. completion of TBM), is 2 small messages and one data item transfer (e.g. LRM, ILH, TBM). The total traffic is 3 small messages and one data item transfer (e.g. LRM, ILH, LAM, and TBM).

Master and Requestor on Same Node

Figure 3A:
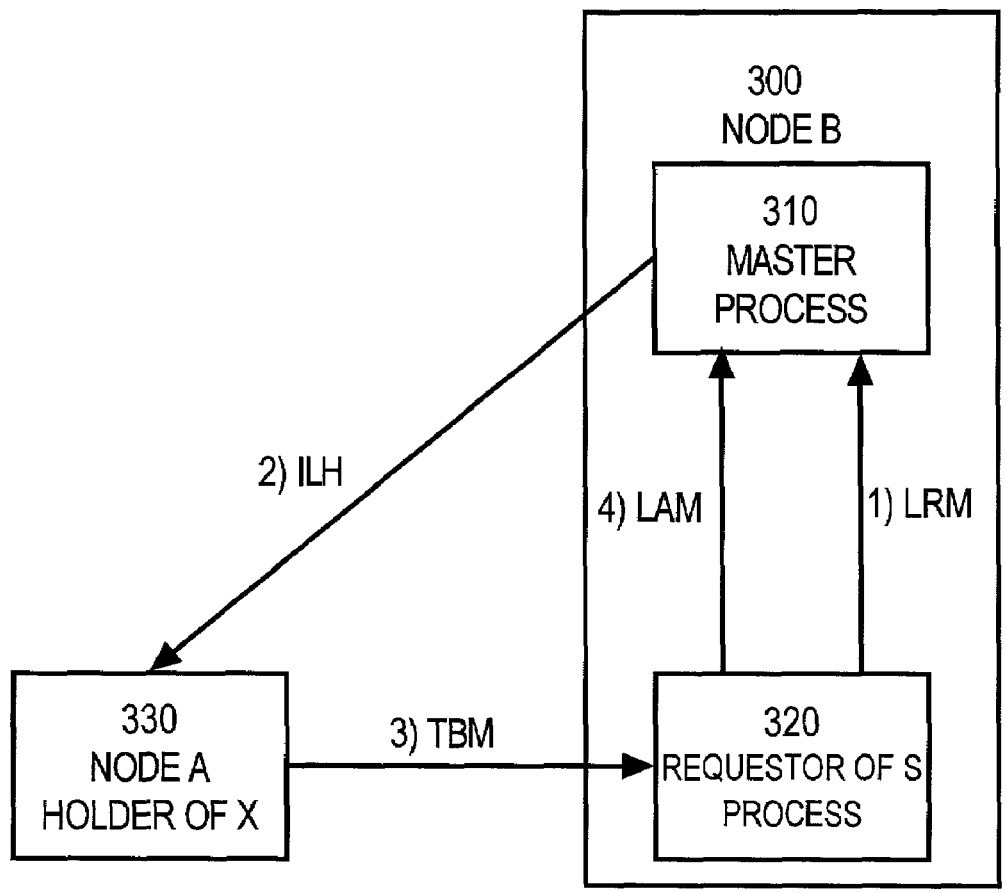
FIG. 3A is a block diagram illustrating the Master and the Requestor on the same node.
Figure 3B:
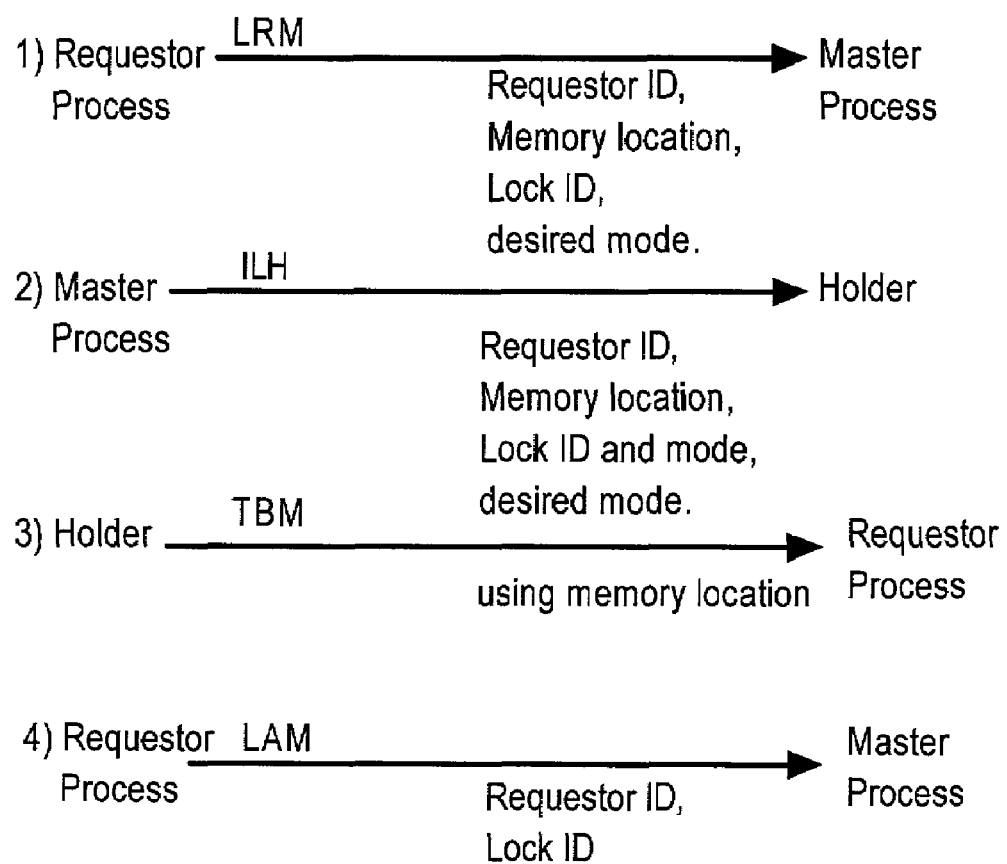
FIG. 3B is a message script, which corresponds to FIG. 3A.

FIG. 3A is a block diagram portraying a cluster where the Master 310 and Requestor 320 are separate processes on the same node, Node B 300, and the Holder 330 is on a separate node, Node A 330. The Requestor 320 needs an S lock and the Holder 330 already has an X lock. FIG. 3B shows a script of messages, which would be used by the scenario depicted in FIG. 3A. FIG. 3B also shows the parameters, which would be associated with these messages.

The Holder 330 currently has a data item and an X lock for this data item. Requestor 320 needs access to this data item and an S lock for it. The steps, which are executed so that the Requestor 320 can gain access to this data item in S mode, are the same as in FIGS. 2A and 2B except for two things: One, the messages LRM and LAM are sent between two processes on the same node instead of two processes on separate nodes and therefore are procedure invocations. Two, the LAM is not essential because the Requestor 320 could update the Master 310's lock structure to down-convert Holder 330's lock.

In this scenario the latency, or time from initial request (e.g. LRM) to time when the data item can be used (e.g. completion of TBM), is one small messages and one data item transfer (e.g. ILH, TBM). The total traffic is also one small message and one data item transfer (e.g. ILH, TBM). The messages LRM and LAM are not considered a part of the latency or total traffic since these messages are between processes on the same node and therefore are treated as procedure invocations.

Master and Holder on Same Node

Figure 4A:
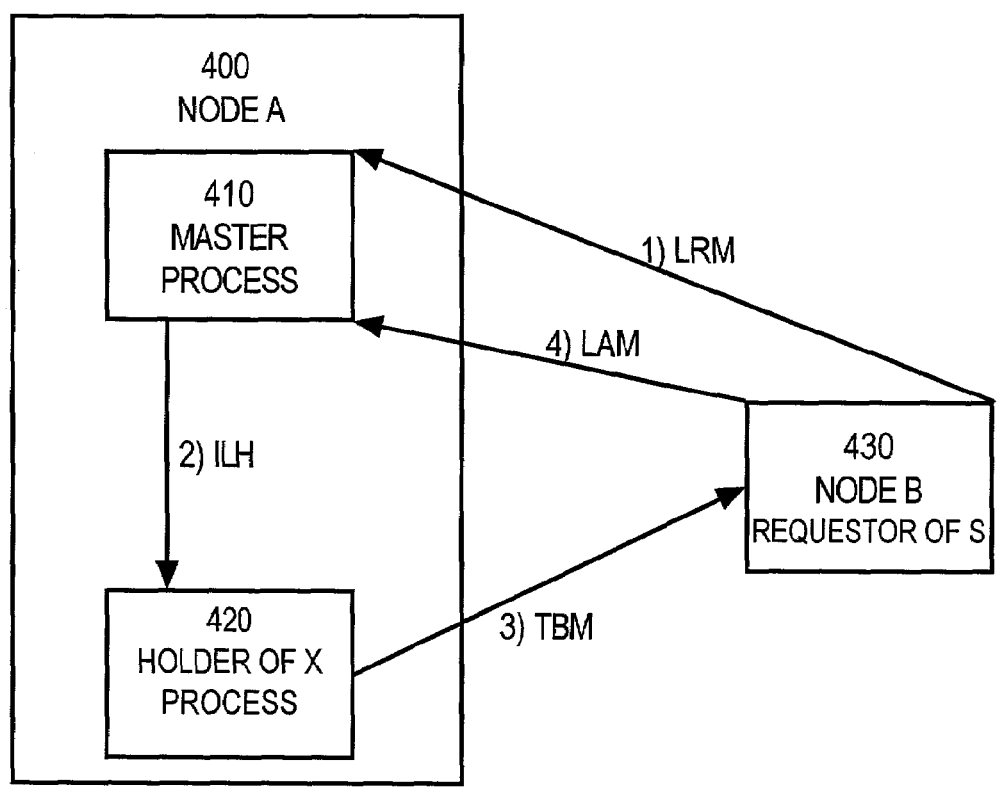
FIG. 4A is a block diagram illustrating the Master and the Holder on the same node.
Figure 4B:
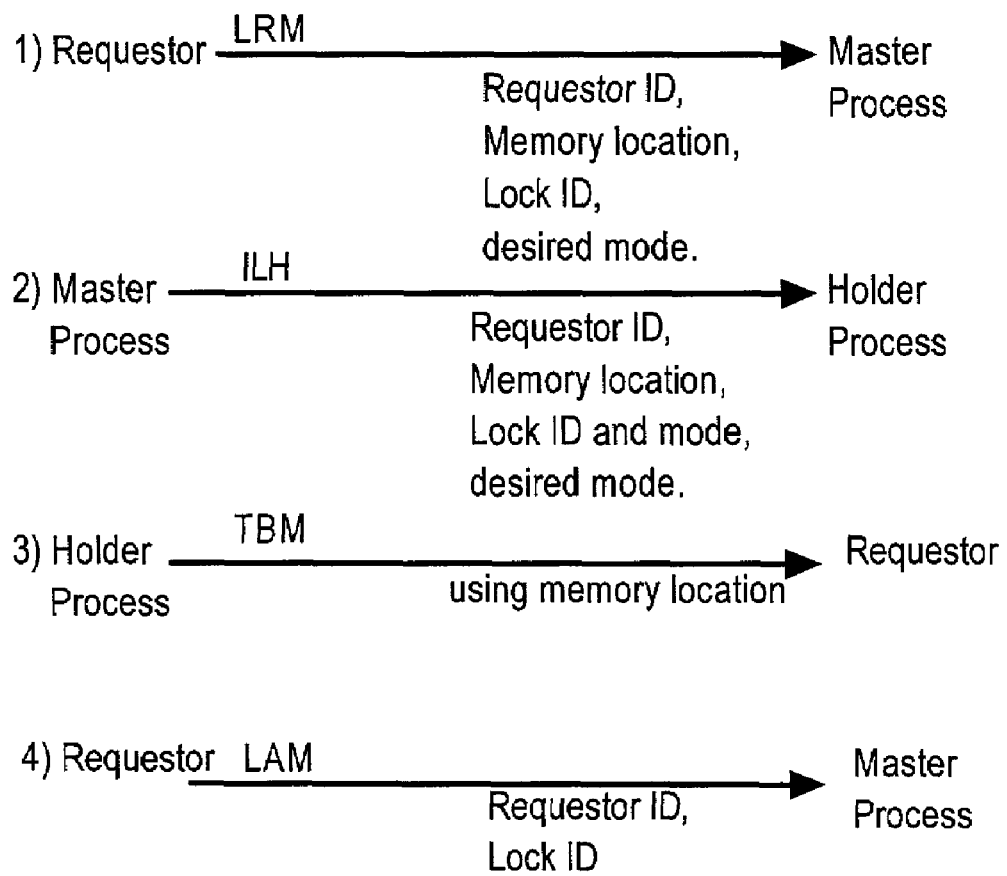
FIG. 4B is a message script, which corresponds to FIG. 4A.

FIG. 4A is a block diagram portraying a cluster where the Master 410 and Holder 420 are separate processes on the same node, Node A (box 400), and the Requestor 430 is on a separate node, Node B (box 430). The Requestor 430 needs an S lock and the Holder 420 already has an X lock. FIG. 4B shows a script of messages, which would be used by the scenario depicted in FIG. 4A. FIG. 4B also shows the parameters, which would be associated with these messages.

The Holder 420 currently has a data item and an X lock for this data item. Subsequently, a Requestor 430 needs access to this data item and an S lock for it. The steps, which are executed so that the Requestor 430 can gain access to this data item in S mode, are the same as in FIGS. 2A and 2B except for two things: One, the message ILH is sent between two processes on the same node instead of between two processes on separate nodes. Two, the LAM from Requestor 430 to Master 410 is not essential. The reason being that after the Holder 420 receives the ILH, the Holder 420 can down convert the Holder's local lock mode and at the same time the Holder 420 can also update the Requestor 430's lock mode in the Master 410's lock structures.

In this scenario the latency, or time from initial request (e.g. LRM) to time when the data item can be used (e.g. completion of TBM), is two small messages and one data item transfer (e.g. LRM, LAM, TBM). The total traffic is also two small message and one data item transfer (e.g. LRM, LAM, TBM). If the LAM is eliminated then the latency is one small message and one data item transfer (e.g. LRM, TBM) and the total traffic is also one small message and one data item transfer (e.g. LRM, TBM). The message ILH is not considered a part of the latency or total traffic since ILH is between processes on the same node and therefore is treated as a procedure invocation.

Multiple Share Lock Holders and Requestor of S Lock

Figure 5A:
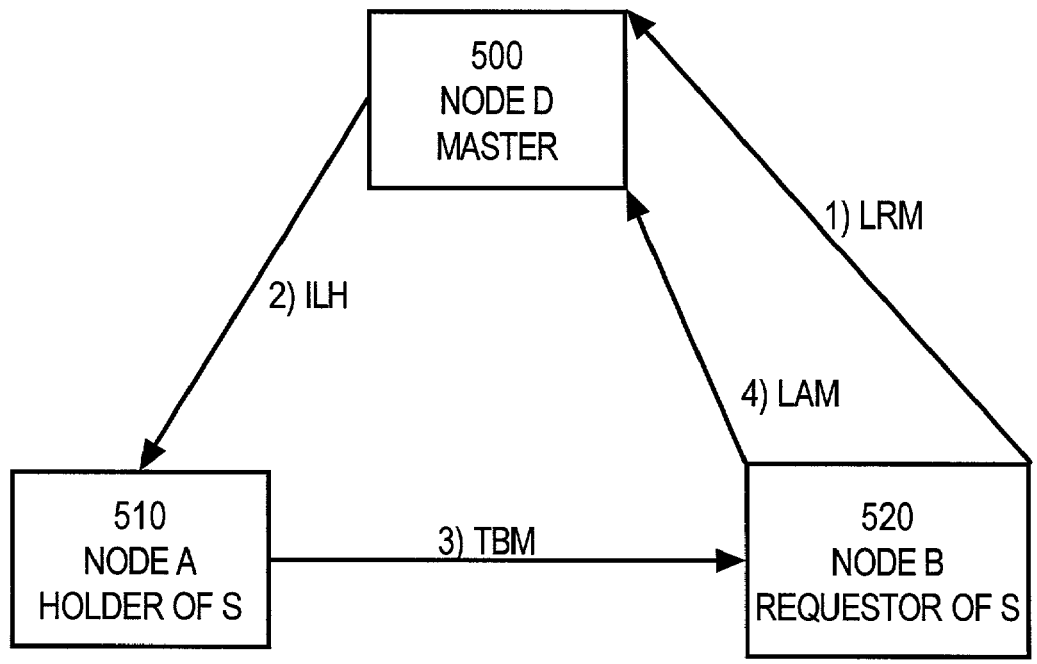
FIG. 5A is a block diagram illustrating multiple share lock Holders and a Requestor of a share lock.
Figure 5B:
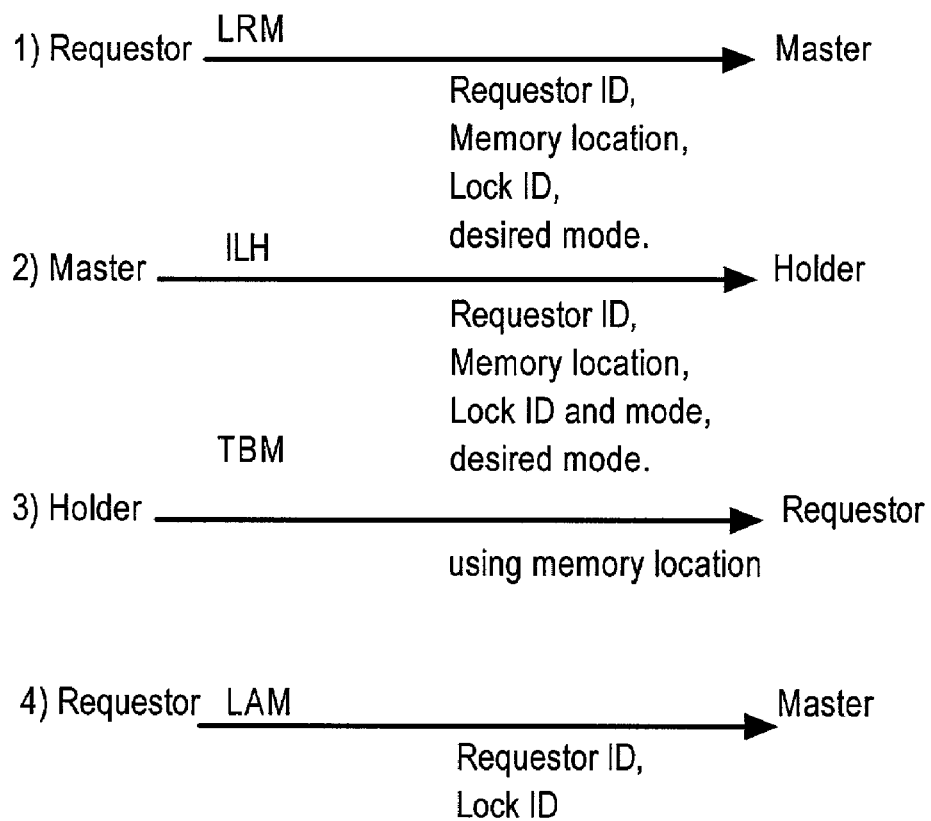
FIG. 5B is a message script, which corresponds to FIG. 5A.

FIG. 5A is a block diagram portraying a cluster where the Master 500, two Holders (boxes 510 and 530) and a Requestor 520 are on separate nodes in a cluster. Furthermore, the Requestor 520 needs an S lock and the Holders (boxes 510 and 530) already have S locks. The two S lock Holders (boxes 510 and 530) will not need to relinquish their respective S locks in order for the Requestor 520 to also obtain an S lock. FIG. 5B shows a script of messages, which would be used by the scenario depicted in FIG. 5A. FIG. 5B also shows the parameters, which would be associated with these messages. The steps, which are executed so that the Requestor 520 can gain access to this data item in S mode, are the same as in FIGS. 2A and 2B except that the Master 500 picks only one of the Share Lock Holders (boxes 510 and 520), which are on Node A and Node C, to send the ILH to.

As shown in FIG. 5A, the Master 500 sends the ILH to the Holder 510. Various methods can be used by the Master 500 to pick which Holder (510 or 530) to send the ILH to. Two such possibilities are as follows:

1) pick the most recent grantee of the S lock because it is more likely to have the data item in cache; or 2) if there is an S lock Holder on the same node as the Master, pick the S lock Holder that is on the same node as the Master thus reducing message traffic. The above possibilities for picking which Holder to send the ILH to will apply to the other scenarios where there are multiple Holders. From there on, the steps in FIGS. 5A and 5B are the same as in FIGS. 2A and 2B respectively.

Multiple Share Lock Holders and Requestor of X Lock

Figure 6A:
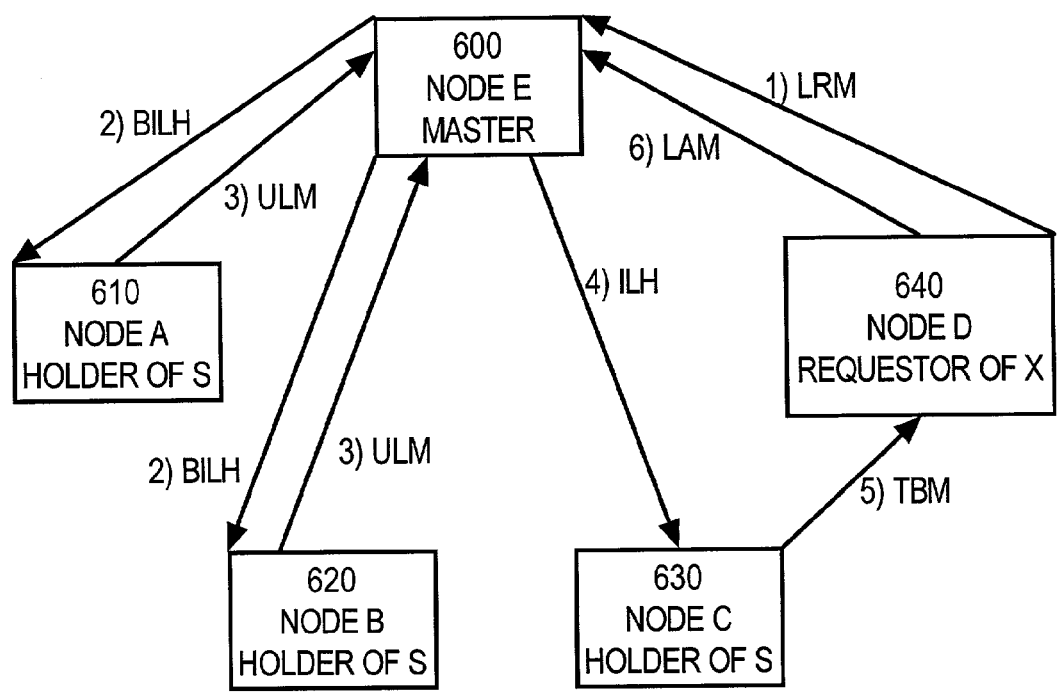
FIG. 6A is a block diagram illustrating multiple share lock Holders and a requestor of an exclusive lock.
Figure 6B:
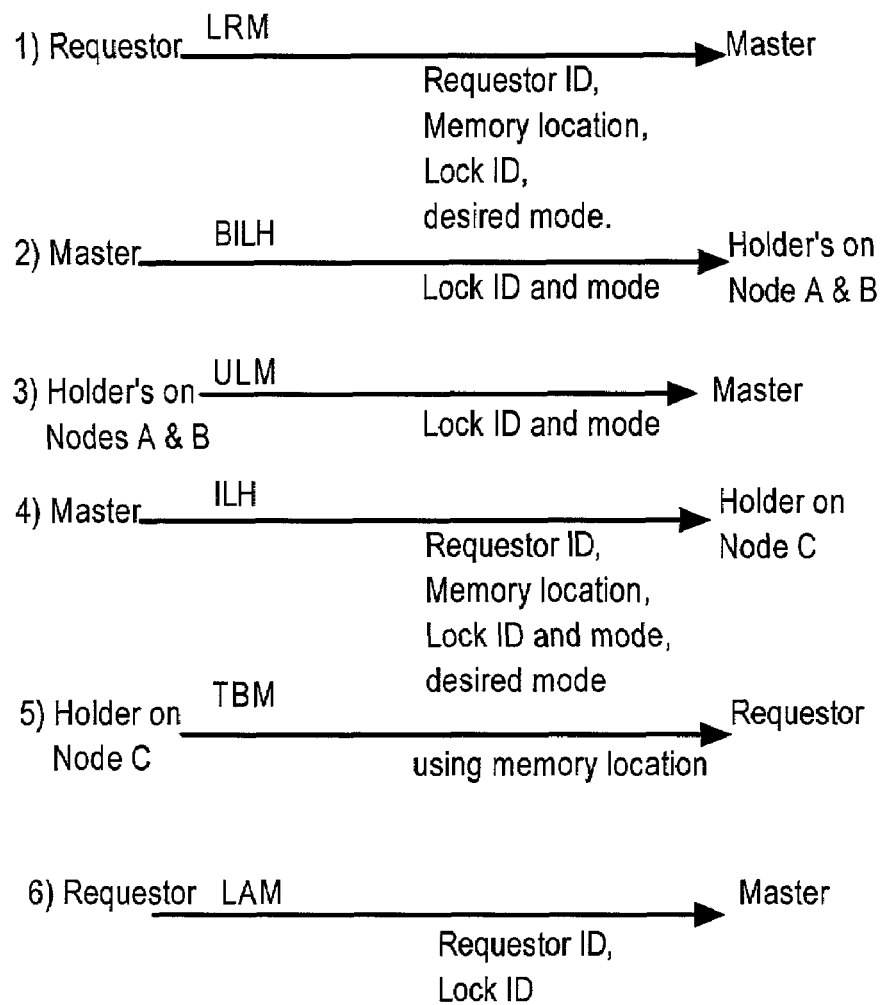
FIG. 6B is a message script, which corresponds to FIG. 6A.

FIG. 6A is a block diagram portraying a cluster where the Master 600, three Holders (boxes 610, 620, 630) and a Requestor 640 are on separate nodes in a cluster. The Requestor 640 needs an X lock and the three Holders (boxes 610, 620, 630) already have S locks. In order for the Requestor 640 to obtain an X lock, the three Holders (boxes 610, 620, 630) will need to relinquish their respective S locks. FIG. 6B shows a script of messages, which would be used by the scenario depicted in FIG. 6A. FIG. 6B also shows the parameters, which would be associated with these messages.

The following steps are executed so that the Requestor 640 can gain access to this data item in X mode:

1) Requestor Sends LRM to Master:

In order to request access to the data item and to obtain an X lock for this data item, the Requestor box 640 sends an LRM to the Master 600. Associated with the LRM is a memory location into which the requested data item will ultimately be transferred and a desired lock mode, which indicates that the Requestor 640 needs an S lock.

2) Master Sends BILH to All but One of the Holders:

When the Master 600 receives the LRM, the Master 600 sends a BILH to all of the Holders (boxes 610, 620) simultaneously except one (Holder 630) to inform the other Holders (boxes 610, 620) that there is a Requestor 640 that needs the data item in exclusive mode.

3) Notified Holders Respond with ULM to Master:

The notified Holders (boxes 610, 620) release their respective S locks and respond back to the Master 600 with a ULM indicating that their locks (e.g. Holders on 610 and 620) have been released. The ULMs will be sent out by the notified Holders (boxes 610, 620) to the Master 600 at approximately the same time.

4) Master Sends ILH to Last Holder:

When the Master 600 receives the last of the ULMs, the Master 600 sends an ILH to the last of the S lock Holders, which in this scenario is Holder 630, to inform this last Holder 630 that there is a Requestor 640, which needs the data item in exclusive mode (e.g. X lock).

5) Last Holder Sends TBM to Requestor:

The last Holder 630 will transfer the requested data item with a TBM using the Requestor's memory location (box 640). This last Holder 630 performs a memory-to-memory transfer to transfer the data item to the Requestor 640. The Requestor 640 of the X lock will interpret receipt of the data item as a lock grant, thus eliminating the LGM and DCM. Furthermore since the Holder 630 has an S lock and no other Holder may hold any other locks at the same time that an X lock is being held, the last Holder 630 will release its S lock upon transferring the data item to the Requestor 640.

6) Requestor Sends LAM to Master:

The Requestor 640 sends a LAM to the Master 600 indicating that the Requestor 640 has assumed an X lock for the data item, which was transferred to the Requestor 640.

In this scenario the latency, or time from initial request (e.g. LRM) to time when the data item can be used (e.g. completion of TBM), is 4 small messages and one data item transfer (e.g. LRM, BILH, ULM, ILH, TBM). The total traffic depends on the number of S lock holders.

Master Receives Lock Request Message Before Lock Assume Message

Figure 7A:
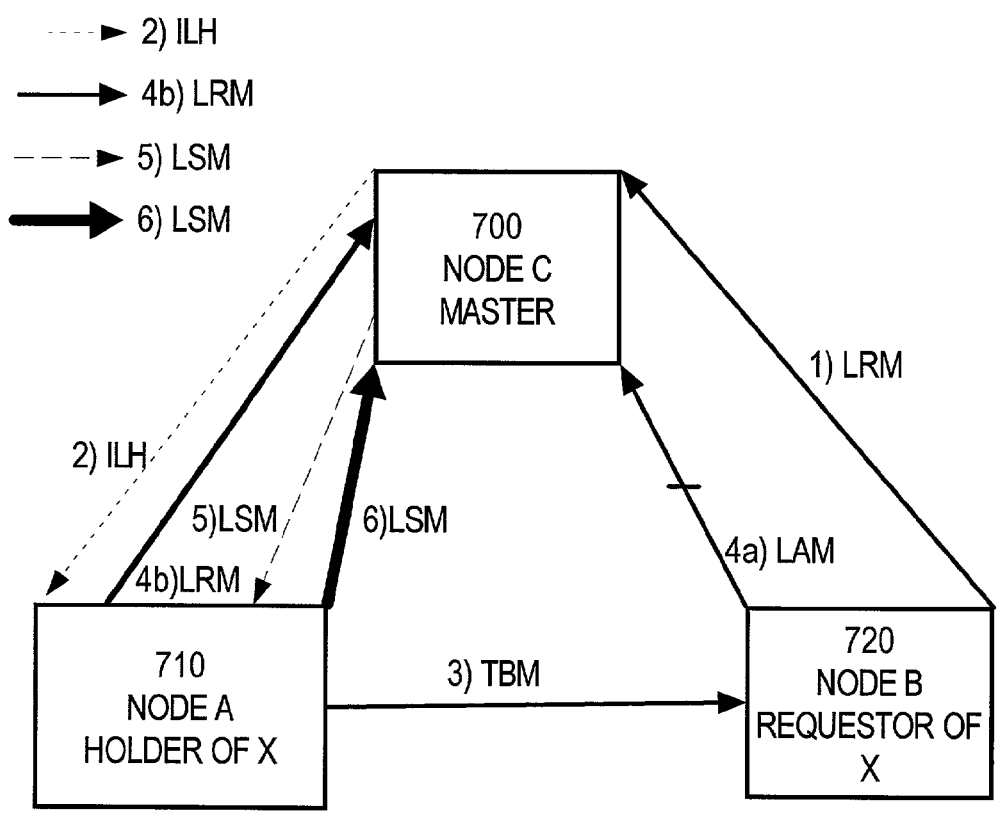
FIG. 7A is a block diagram illustrating a situation where the Master receives a lock request message before receiving a lock assume message.
Figure 7B:
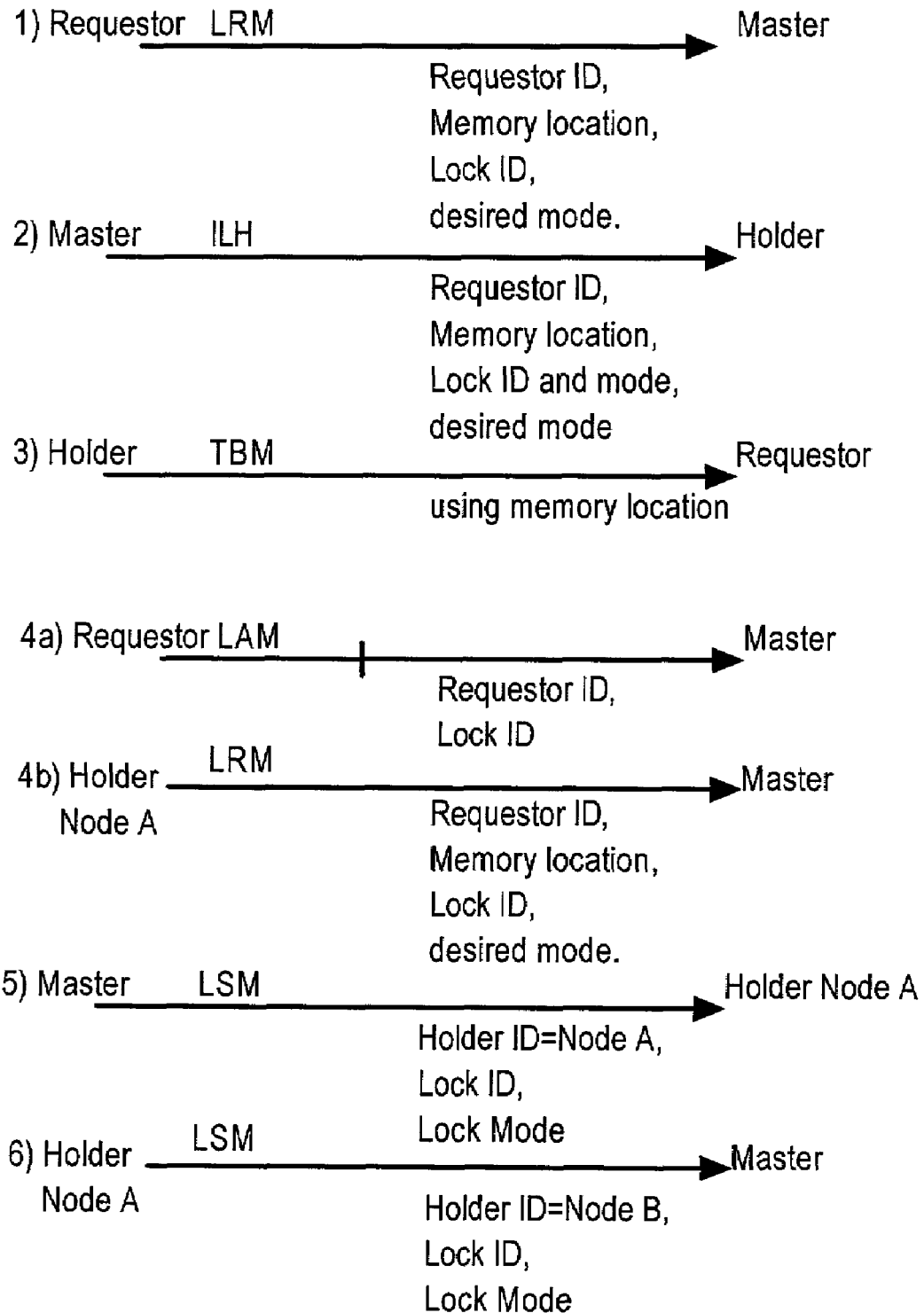
FIG. 7B is a message script, which corresponds to FIG. 7A.

FIG. 7A is a block diagram portraying a cluster where the Master 700, Holder 710 and Requestor 720 are on separate nodes in a cluster. Furthermore, the Requestor 720 needs an X lock and the Holder 710 already has an X lock. FIG. 7B shows a script of messages, which would be used by the scenario depicted in FIG. 7A. FIG. 7B also shows the parameters, which would be associated with these messages. The Holder 710 currently has a data item and an X lock for this data item. Subsequently a Requestor 720 needs access to this data item and an X lock for it.

The following steps are executed so that the Requestor 720 can gain access to this data item in X mode:

1) Requestor Sends LRM to Master:

In order to request access to the data item and to obtain an X lock for this data item, the Requestor 720 sends an LRM to the Master 700. Associated with the LRM is a memory location into which the requested data item will ultimately be transferred and a desired lock mode, which indicates that the Requestor 720 needs an X lock.

2) Master Sends ILH to Holder:

When the Master 700 receives the LRM, the Master 700 sends an ILH to the Holder 710 to inform the Holder 710 that there is a Requestor 720, which needs the data item in exclusive mode.

3) Holder Sends TBM to Requestor:

The Holder 710 will transfer the requested data item with a TBM using the Requestor's memory location (box 720). The Holder 710 performs a memory-to-memory transfer to transfer the data item to the Requestor 720. The Requestor 710 of the X lock will interpret receipt of the data item as a lock grant, thus eliminating the LGM and DCM. Furthermore since the Holder 710 has an X lock and no other Holder may hold any other locks at the same time that an X lock is being held, the Holder 710 will release its X lock upon transferring the data item. The Holder 710 of the X lock will no longer notify the Master 700 of the release with a DCM.

4) Requestor Sends LAM to Master but Master Receives it After the LRM:

a) The Requestor 720 sends a LAM to the Master 700 indicating that the Requestor 720 has assumed an X lock for the data item that was transferred to the Requestor 720.

b) However, before the Master 700 can receive the LAM that the Requestor 720 sent, the Holder 710, which no longer thinks it is a Holder, sends an LRM to request an X lock again for this same data item.

5) Master Sends LSM to Holder:

When the Master 700 receives the LRM (refer to message 4b in FIG. 7A) from the Holder 710, the Master 700 determines that there is a mismatch between the Master's lock records on Node C (box 700) and the Holder's lock records on Node A (box 710) for the data item concerned. At this point in time, the Master 700 is waiting for an LAM to indicate that the new Holder 720 is on Node B. However until the Master 700 actually receives this LAM, the Master's lock records (box 700) still show that the Holder 710 is on Node A. To synchronize lock records, the Master 700 sends an LSM, along with the Master's recorded lock mode, to the Holder 710 on Node A.

6) Holder Sends LSM to Master:

When the Holder 710 receives the LSM from the Master 700, the Holder 710 determines that the Holder's recorded lock mode (box 710) is out of sync with the Master's recorded lock mode (box 700) for this data item. The Holder 710 responds to this determination by sending an LSM to the Master 700 along with the Holder's recorded lock mode (box 710) for this data item. When the Master 700 receives the LSM from the Holder 710, the Master 700 and Holder 710 will be synchronized with respect to the lock mode associated with this data item.

When the Master receives the LAM from Requestor 720, Master 700 changes its lock information to indicate that Requestor 720 has an X lock, and sends to Requestor 720 an ILH to inform new Holder (ex-Requestor) 720 that new Requestor (ex-Holder) 720 desires a lock. From here on the processing will continue in a normal fashion.

Although steps 5 and 6 produce correct results, steps 5 and 6 are not essential. When the Master 700 receives the LRM (4b), the Master 700 may determine the correct lock state and implicitly update the Master 700's local lock state. This is particularly important for hot blocks because the probability that ex-Holder 710 will send a request immediately after TBM (3) is high.

Disconnect During Data Transfer

Figure 8A:
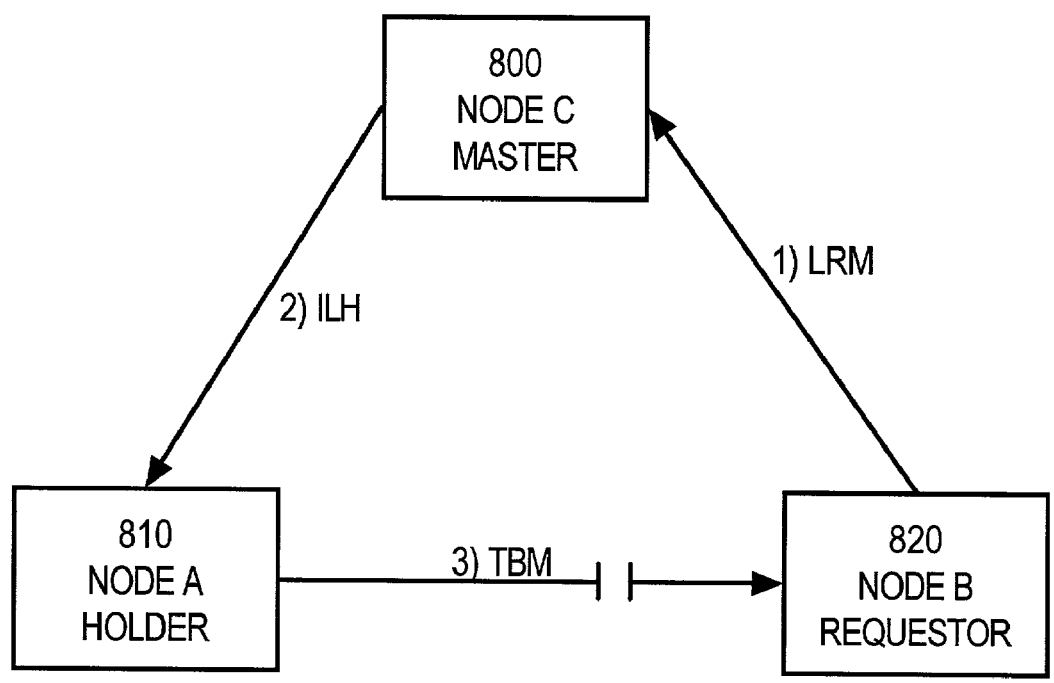
FIG. 8A is a block diagram illustrating how to handle a disconnect during the transfer of a data item.
Figure 8B:
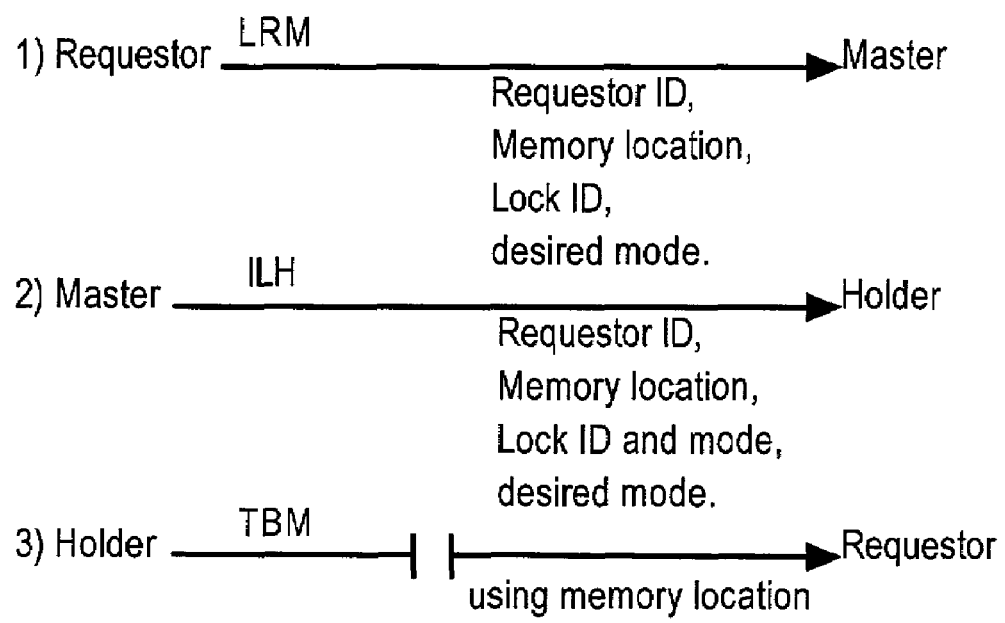
FIG. 8B is a message script, which corresponds to FIG. 8A.

FIG. 8A is a block diagram portraying a cluster where the Master 800, Holder 810 and Requestor 820 are on separate nodes in a cluster. Furthermore, the transmission of the data item does not reach the Requestor 820. For the purposes of discussing this embodiment of the invention, the lock modes do not matter. FIG. 8B shows a script of messages, which would be used by the scenario depicted in FIG. 8A. FIG. 8B also shows the parameters, which would be associated with these messages. The Holder 810 currently has a data item and an X lock for this data item. Subsequently a Requestor 820 needs access to this data item and lock for it. The following steps are executed so that the Requestor 820 can gain access to this data item and the appropriate lock:

1) Requestor Sends LRM to Master:

In order to request access to the data item and to obtain an S lock for this data item, the Requestor 820 sends an LRM to the Master 800. Associated with the LRM is a memory location into which the requested data item will ultimately be transferred and a desired lock mode.

2) Master Sends ILH to Holder:

When the Master 800 receives the LRM, the Master 800 sends an ILH to the Holder 810 to inform the Holder 810 that there is a Requestor 820, which needs the data item in the indicated lock mode.

3) Holder Sends TBM to Requestor:

The Holder 810 will transfer the requested data item with a TBM using the Requestor's (box 820) memory location. However, due to some error, transfer of the requested data item is not completed. Therefore, the Requestor 820 of the lock is not able to interpret receipt of the data item as a lock grant. Furthermore the Holder 810 does not send an LAM to the Master 800 indicating that the Holder 820 has assumed the lock.

According to one embodiment, this type of error situation is addressed by causing the Master 800 to include with all ILH messages the Master's current understanding of the lock mode held by the entity to which the ILH is being sent. For example, if the information at Master 800 still indicates that Holder 810 has an exclusive lock on a resource, Master 800 will send Holder 810 an ILH when another node requests a lock on that resource. Master 800 will include with that ILH data that indicates that Master 800 believes Holder 810 has an X lock on the resource.

If a Holder 810 receives an ILH message with a lock status that does not match the lock status records of Holder 810, then the Holder 810 can refuse the ILH and update the Master 800 as to the Holder's lock status for the data item. For example, Holder 810 may respond to an ILH that indicates an X lock mode by sending an LSM to the Master 800 to indicate that Holder 810 has downgraded its lock mode. When the Requestor 820 determines that the TBM will not be coming, Requestor 820 will retry by resending the LRM to Master 800.

Multiple S Lock Requestors

Figure 9A:
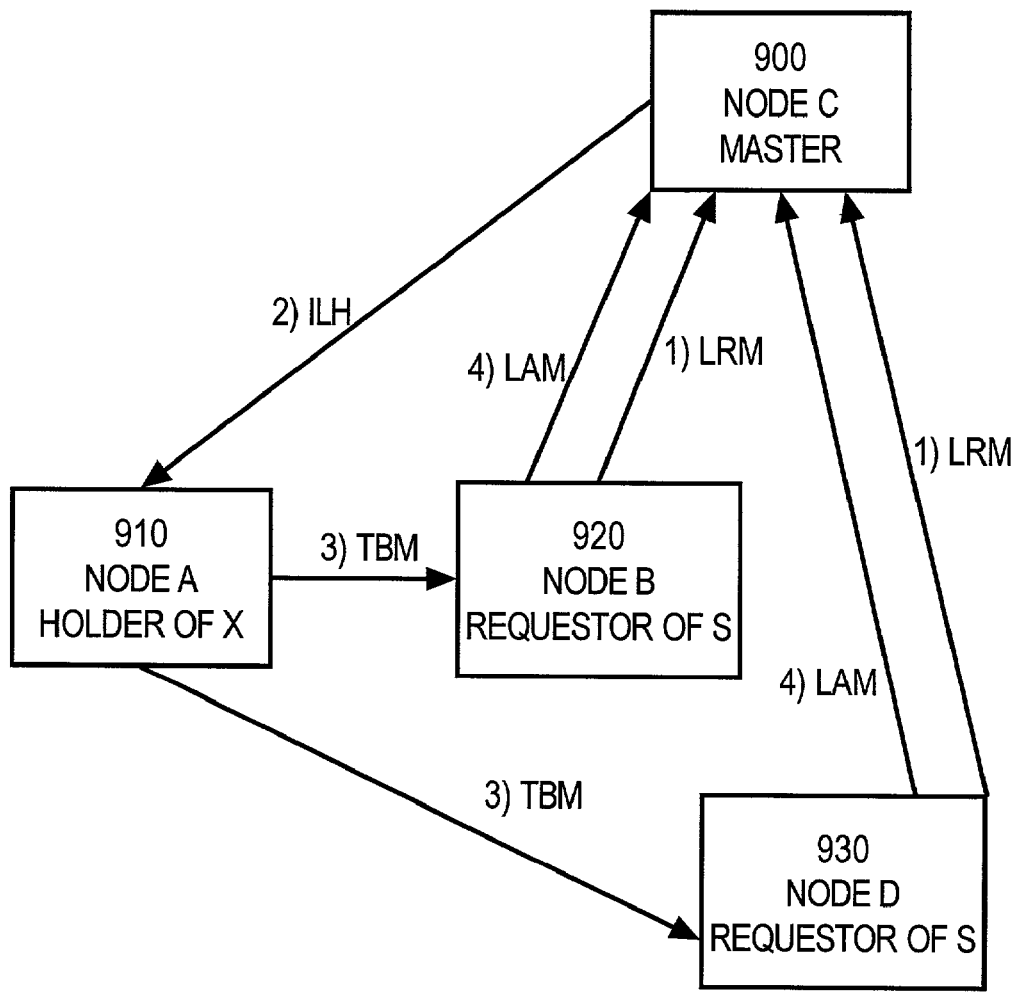
FIG. 9A is a block diagram illustrating how to handle concurrent lock requests from more than one share lock requestor.
Figure 9B:
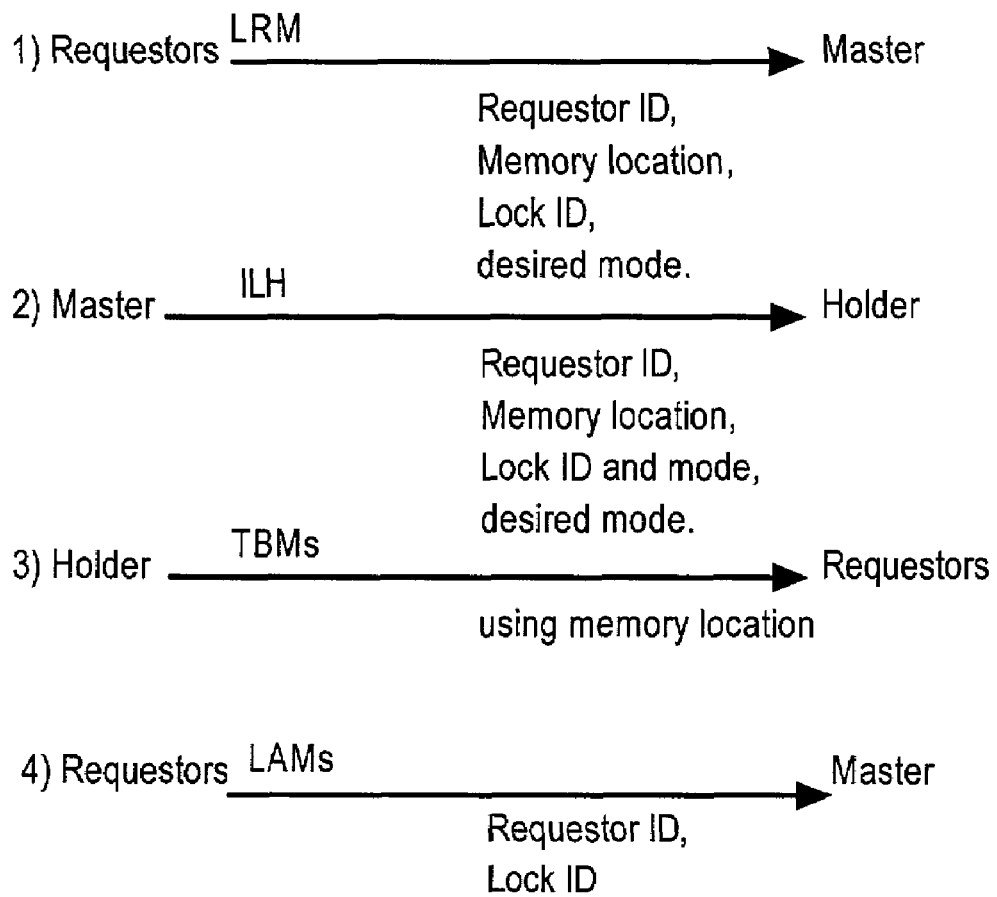
FIG. 9B is a message script, which corresponds to FIG. 9A.

FIG. 9A is a block diagram portraying a cluster where the Master 900, Holder 910 and two Requestors (boxes 920 and 930) are on separate nodes in a cluster. Furthermore the Requestors 920 and 930 need S locks and the Holder 910 already has an X lock. The Requestors 920 and 930 send their S lock requests at approximately the same time and the Master 900 receives the S lock requests at approximately the same time. FIG. 9B shows a script of messages that would be used by the scenario depicted in FIG. 9A. FIG. 9B also shows the parameters that would be associated with these messages.

The following steps are executed so that the Requestors 920 and 930 can gain access to this data item in S mode:

1) Requestors Sends LRMs to Master:

In order to request access to the data item and to obtain an S lock for this data item, the Requestors 920 and 930 send LRMs to the Master 900. Associated with the LRMs are memory locations associated with the Requestors 920 and 930 into which the requested data item will ultimately be transferred and a desired lock mode, which indicates that the Requestors 920 and 930 need S locks. The master receives the LRMs from Requestors 920 and 930 at approximately the same time.

2) Master Sends ILH to Holder:

When the Master 900 receives the LRMs, the Master 900 sends an ILH to the Holder 910 to inform the Holder 910 that there are two Requestors 920 and 930 that need the data item in share mode. Instead of sending out separate ILHs to Holder 910 for each of the Requestors 920 and 930, the Master 900 batches the requests into one ILH by including the memory locations, into which the data item needs to be copied, for both Requestor 920 and 930 in the one ILH.

3) Holder Sends TBM to Requestors:

The Holder 910 will transfer the requested data item with a TBM using the Requestors' memory locations (box 920 and 930). The Holder 910 perform memory-to-memory transfers to transfer the data item to the Requestors 920 and 930.

The Requestors 920 and 930 of the S lock interpret receipt of the data item as a lock grant, thus eliminating the need to wait for the LGM and DCM. Furthermore since the Holder 910 has an X lock and no other Holder may hold any other locks at the same time that an X lock is being held, the Holder 910 will down-convert its lock from an X lock to an S lock upon transferring the data item. According to one embodiment, this down-convert is performed by changing lock information maintained locally on Holder 910, but Holder 910 does not notify the Master 900 of this down conversion with a DCM.

4) Requestors send LAMs to Master:

The Requestors 920 and 930 sends LAMs to the Master 900 indicating that the Requestors 920 and 930 have assumed their respective S locks for the data item that was transferred by the Holder 910. In response to the LAM, the Master 900 revises its lock information for the data item to indicate that Requestor 920, Requestor 930 and Holder 910 have S locks on the data item.

In this scenario the latency, or time from initial request (e.g. LRM) to time when the data item can be used (e.g. completion of TBM), is 2 small messages and one data item transfer (e.g. LRM, ILH, TBM). The total traffic is 5 small messages and two data item transfer (e.g. two LRMs, one ILH, two LAMs, and two TBMs).

Timing Issues of Lock Request Messages

Figure 10A:
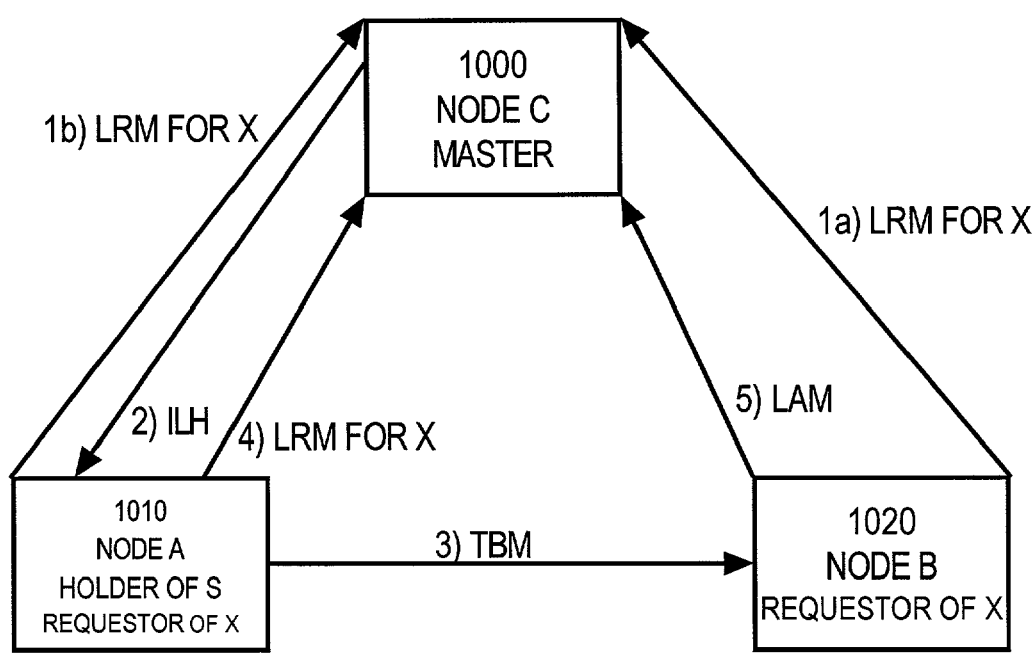
FIG. 10A is a block diagram illustrating how to handle timing issues for lock request messages.
Figure 10B:
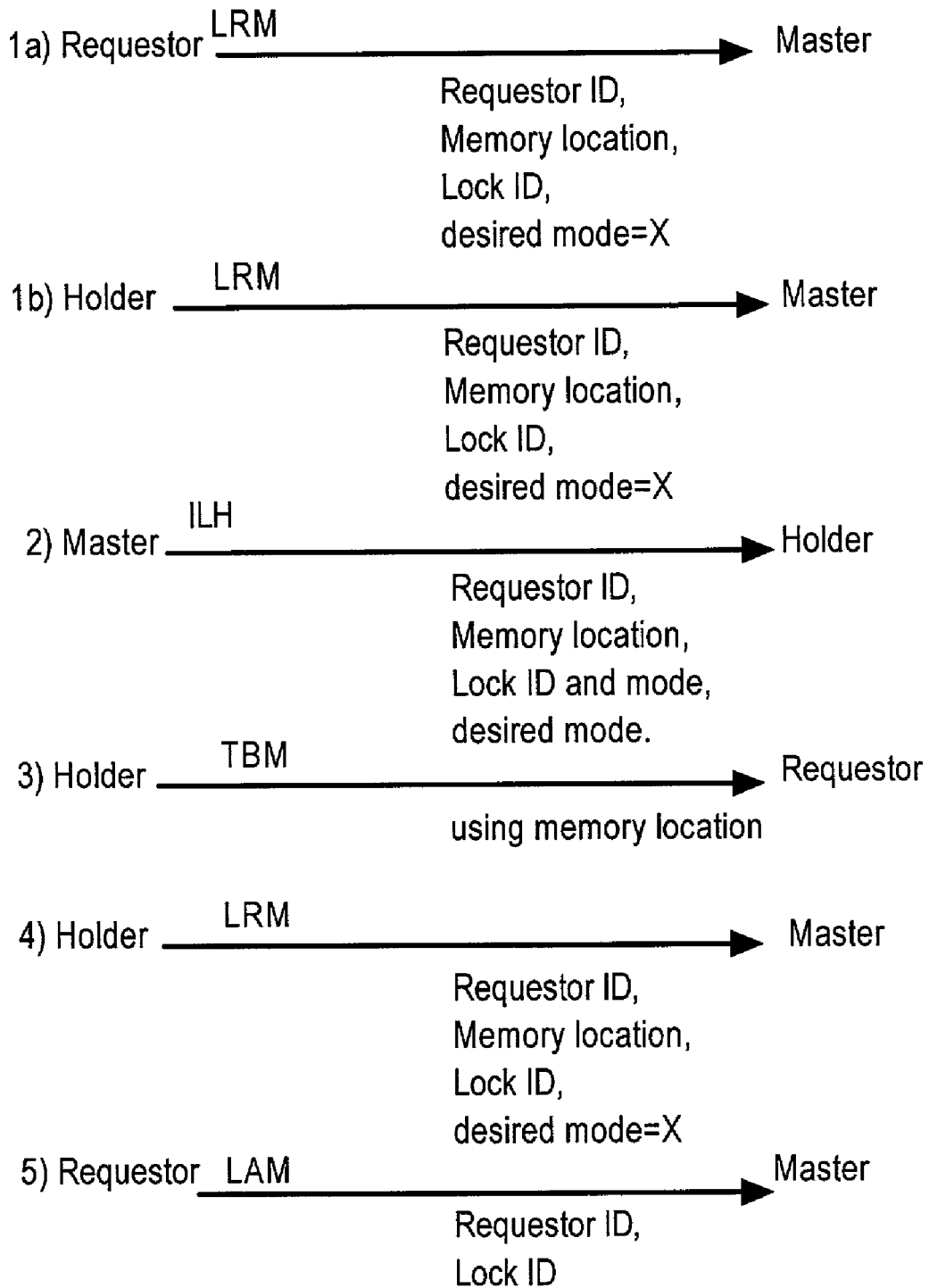
FIG. 10B is a message script, which corresponds to FIG. 10A.

FIG. 10A is a block diagram portraying a cluster where the Master 1000, Holder 1010 and Requestor 1020 are on separate nodes in a cluster. The Holder 1010 has an S lock and needs to raise the lock mode to an X lock. Furthermore the Requestor 1020 also needs an X lock. One point of interest in this scenario is that the Master 1000 will receive an LRM from the Requestor 1020 and shortly thereafter receive an LRM from the Holder 1010 requesting to raise the Holder 1010's lock mode from S to X. FIG. 10B shows a script of messages that would be used by the scenario depicted in FIG. 10A. FIG. 10B also shows the parameters that would be associated with these messages.

The Holder 1010 currently has a data item and an S lock for this data item. Both Holder 1010 and Requestor 1020 need access to this data item in exclusive mode and therefore need an X lock for this data item. The following steps are executed so that the Requestor 1020 can gain access to this data item in X mode:

1a) Requestor Sends LRM to Master:

In order to request access to the data item and to obtain an X lock for this data item, the Requestor 1020 sends an LRM to the Master 1000. Associated with the LRM is a memory location into which the requested data item will ultimately be transferred and a desired lock mode, which indicates that the Requestor 1020 needs an X lock.

1b) Holder Sends LRM to Master to Raise Lock from S to X:

In order to gain exclusive mode on a data item that the Holder 1010 already has in S mode, the Holder 1010 sends an LRM requesting to raise the lock mode for this data item from S to X to Master 1000. However, the Master 1000 has already received the Requestor 1020's LRM before receiving the Holder 1010's LRM.

2) Master Sends ILH to Holder:

When the Master 1000 receives the LRM from the Requestor 1020, the Master 1000 sends an ILH to the Holder 1010 to inform the Holder 1010 that there is a Requestor 1020 that needs the data item in exclusive mode. The Holder 1010 recognizes there is a discrepancy between itself and Requestor 1020.

3) Holder Sends TBM to Requestor:

The Holder 1010 will transfer the requested data item with a TBM using the Requestor's memory location (box 1020). The Holder 1010 performs a memory-to-memory transfer to transfer the data item to the Requestor 1020.

The Requestor 1020 of the lock interprets receipt of the data item as a lock grant, thus eliminating the need to wait for the LGM and DCM. Furthermore since the Holder 1010 has an X lock and no other Holder may hold any other locks at the same time that an X lock is being held, the Holder 1010 will relinquish its lock upon transferring the data item to Requestor 1020. The Holder 1010 of the X lock will no longer notify the Master 1000 of the fact that the Holder 1010 has relinquished its lock with a DCM.

4) Holder Resends LRM to Master:

At this point, the Holder 1010, which is no longer a holder, tries again to obtain an X lock for the data item in question by sending another LRM to the Master 1000. However, Requestor 1020 already has an X lock for this data item. Therefore, at this point the previous Holder 1010 is treated like any other new Requestor and the previous Holder 1010's new request will be queued behind any other pending requests.

5) Requestor Sends LAM to Master:

The Requestor 1020 sends a LAM to the Master 1000 indicating that the Requestor 1020 has assumed an X lock for the data item that was transferred by the Holder 1010. In response to the LAM, the Master 1000 revises its lock information for the data item to indicate that the previous Holder 1010 no longer has a lock on this data item and Requestor 1020 has an X lock on this same data item. After Master 1000 has received the LAM from Requestor 1020, Master 1000 will treat Node A 1010, which is now a Requestor, like any other Requestor; Thus Master 1000 will send an ILH to Node B 1020 on behalf of Node A 1010.

In this scenario the latency, or time from initial request (e.g. LRM) to time when the data item can be used (e.g. completion of TBM), is 2 small messages and one data item transfer (e.g. LRM, ILH, TBM). The total traffic is 3 small messages and one data item transfer (e.g. LRM, ILH, LAM, and TBM).

Mismatch in Lock Status

Figure 11A:
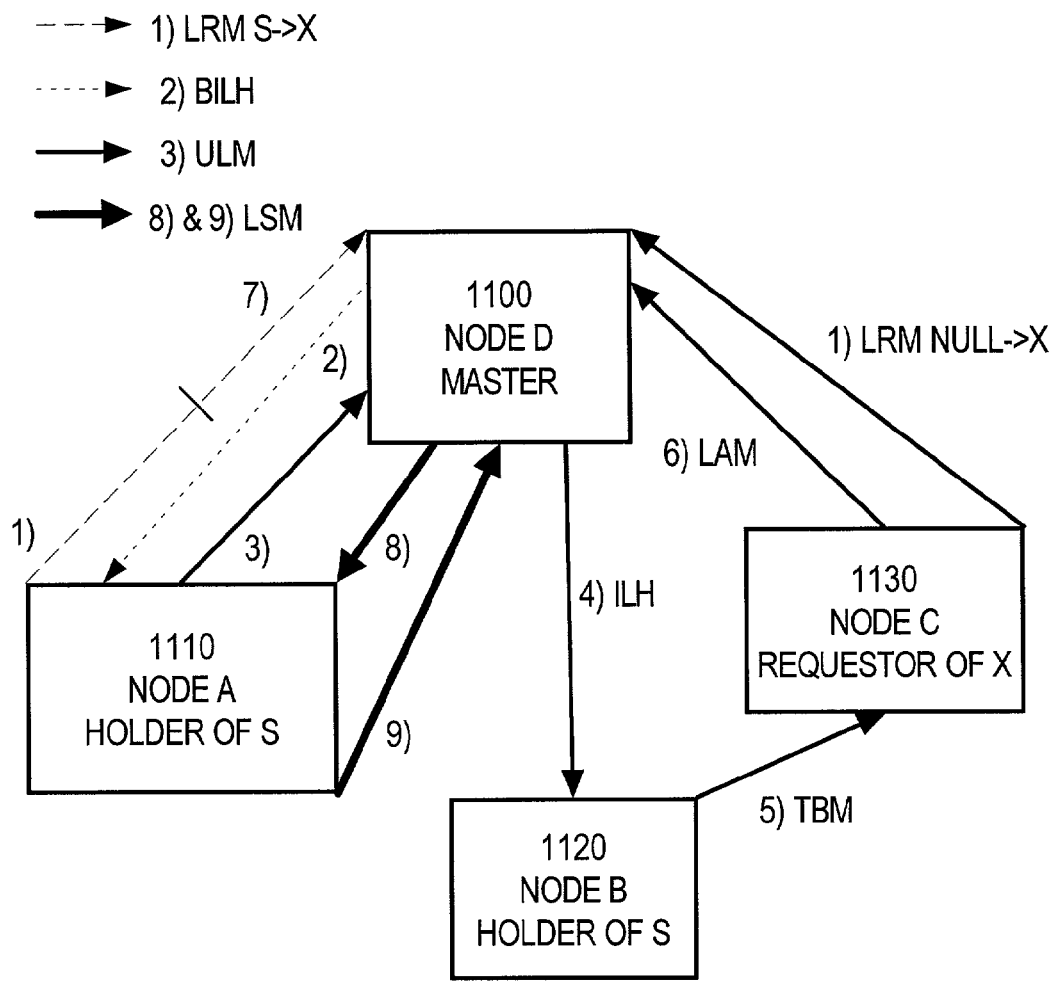
FIG. 11A is a block diagram illustrating how to handle a mismatch in lock status.
Figure 11B:
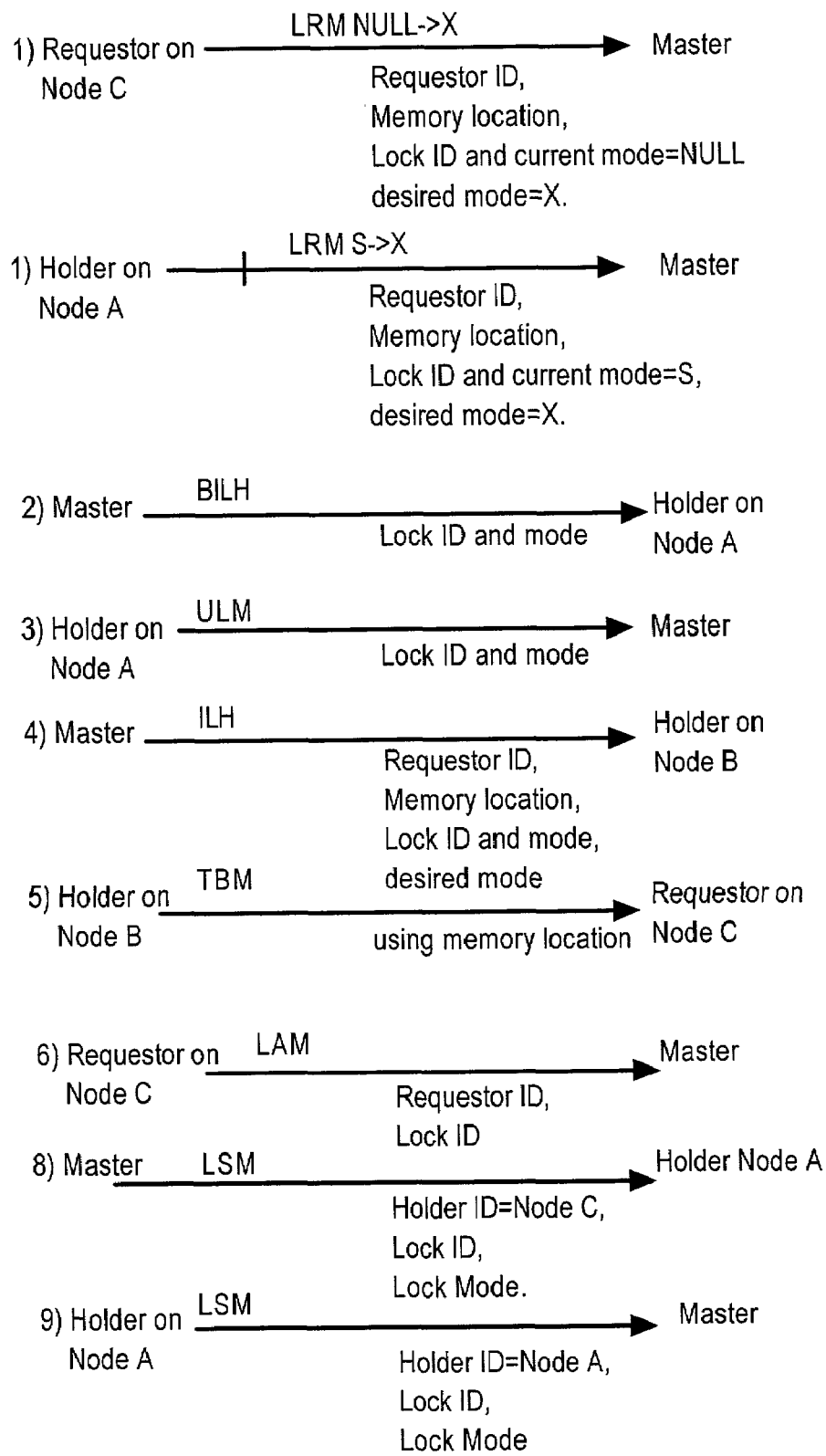
FIG. 11B is a message script, which corresponds to FIG. 11A.

FIG. 11A is a block diagram portraying a cluster where the Master 1100, 620 Holders (boxes 1110 and 1120) and a Requestor 1130 are on separate nodes in a cluster. The two Holders (boxes 1110 and 1120) already have S locks. Holder 1110 requests a raise in lock mode from S to X. Furthermore, The Requestor 1130 needs an X lock. In order for the Requestor 1130 to obtain an X lock, the two Holders (boxes 1110 and 1120) will need to relinquish their respective S locks. FIG. 11B shows a script of messages, which would be used by the scenario depicted in FIG. 11A. FIG. 11B also shows the parameters, which would be associated with these messages.

The following steps are executed so that the Requestor 1130 can gain access to this data item in X mode:

1) Requestor Sends LRM to Master and Holder also Sends LRM to Master:

In order to request access to the data item and to obtain an X lock for this data item, the Requestor 1130 sends an LRM to the Master 1100. Associated with the LRM is a memory location into which the requested data item will ultimately be transferred and a desired lock mode, which indicates that the Requestor 1130 needs an X lock.

At almost the same time, Holder 1110 also sends an LRM to Master 1100 requesting that Holder 1110's lock be raised from S to X. However, according to this scenario, the LRM that Holder 1110 sends will be delayed in arriving at Master 1100. The LRM will contain both the current lock mode and the desired lock mode of Holder 1110 at the time that Holder 1110 sent the LRM.

2) Master Sends BILH to all but one of the Holders:

When the Master 1100 receives the LRM, the Master 1100 sends a BILH to all of the Holders (box 1110) simultaneously except one (Holder 1120) to inform the other Holders (box 1110) that there is a Requestor 1130 that needs the data item in exclusive mode.

3) Notified Holders Respond with ULM to Master:

The notified Holder 1110 releases the S lock that Holder 1110 holds and responds back to the Master 1100 with a ULM indicating that Holder 1110 has released the lock. Holder 1110 will send a ULM to the Master 1100. Since the Master 1100 maintains lock mode with regards to all the entities that the Master 1100 is responsible for, the Master 1100 will update Holder 1110's lock mode, which resides on Master 1100, to indicate that Holder 1110 has released the lock (e.g. null) when Master 1100 receives the LRM from Holder 1110.

4) Master Sends ILH to Last Holder:

When the Master 1100 receives the ULM, the Master 1100 sends an ILH to the last of the S lock Holders, which in this scenario is Holder 1120, to inform this last Holder 1120 that there is a Requestor 1130, which needs the data item in exclusive mode (e.g. X lock).

5) Last Holder Sends TBM to Requestor:

The last Holder 1120 will transfer the requested data item with a TBM using the Requestor's memory location (box 1130). This last Holder 1120 performs a memory-to-memory transfer to transfer the data item to the Requestor 1130. The Requestor 1130 of the X lock will interpret receipt of the data item as a lock grant, thus eliminating the LGM and DCM. Furthermore since the Holder 1120 has an S lock and no other Holder may hold any other locks at the same time that an X lock is being held, the last Holder 1120 will release its S lock upon transferring the data item to the Requestor 1130.

6) Requestor Sends LAM to Master:

The Requestor 1130 sends a LAM to the Master 1100 indicating that the Requestor 1130 has assumed an X lock for the data item, which was transferred to the Requestor 1130.

7) Master Receives LRM from Previous Holder:

At this point, the LRM from the previous Holder 1110 arrives at Master 1100. The Master 1100 thinks that the Holder 1110 has a lock mode of released or null. However, the LRM that the Holder 1110 sent indicates that the Holder 1110's current mode is S, because at the time that Holder 1110 sent the LRM, Holder 1110's lock mode was S. Therefore, the Master 1100 and the Holder 1110 will update each other by exchanging Lock Status Messages (e.g. LSM).

8) Master Sends LSM to Previous Holder:

Master 1100 sends an LSM to Holder 1110 with the lock mode according to the Master 1100's understanding.

9) Previous Holder Sends LSM to Master:

Holder 1110 sends an LSM to Master 1100 with the lock mode according to Holder 1110's understanding. Then Master 110 and Holder 1110 will be synchronized as to the mode for the lock of the originally requested data item.

Hardware Overview

Figure 12:
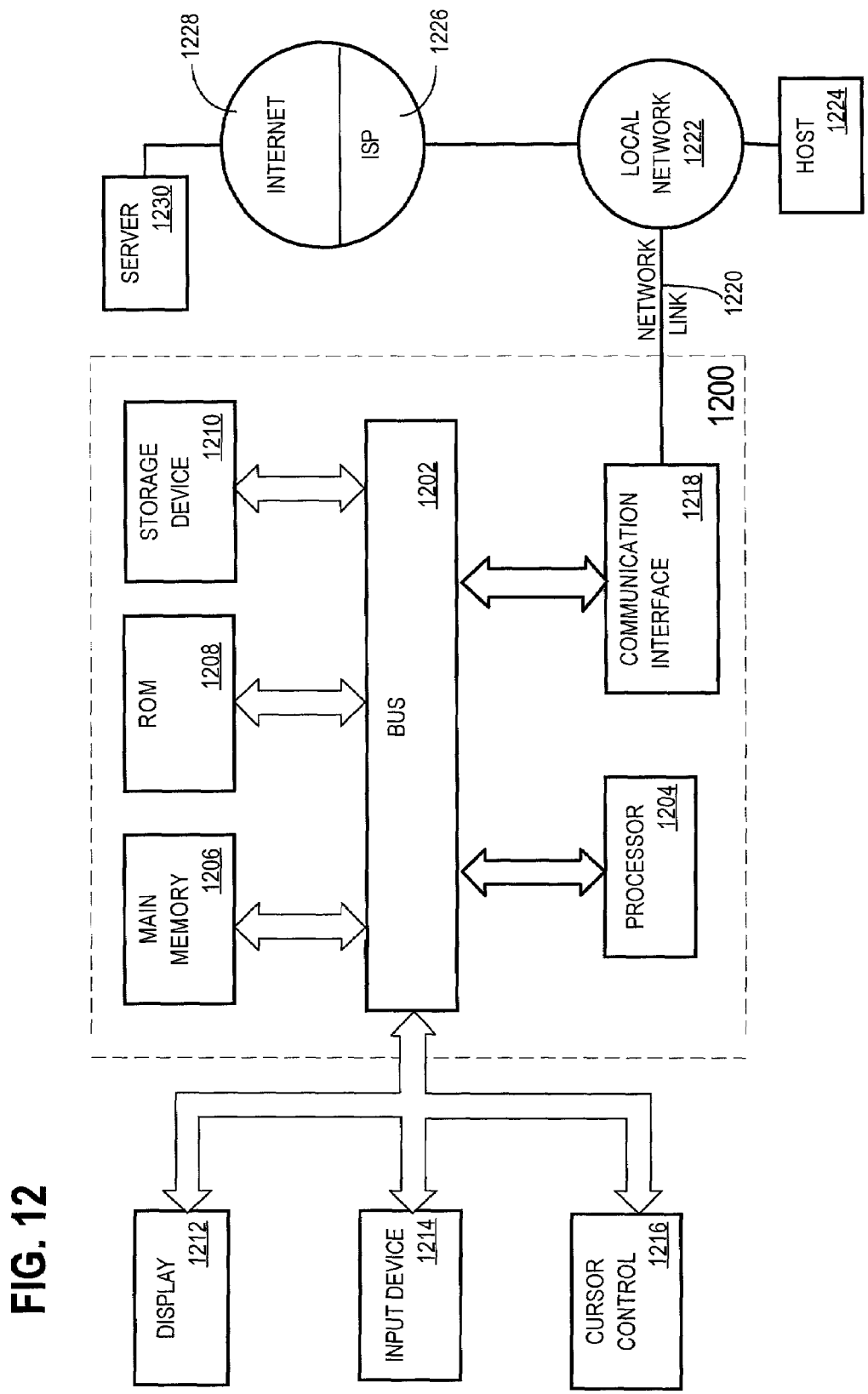
FIG. 12 is a block diagram of a computer system on which an embodiment of the invention may be implemented.

FIG. 12 is a block diagram that illustrates a computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for reducing the overhead associated with a ping. According to one embodiment of the invention, the overhead associated with a ping is reduced by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 belongs to a shared disk system in which data on one or more storage devices (e.g. disk drives 1255) are accessible to both computer system 1200 and to one or more other CPUs (e.g. CPU 1251). In the illustrated system shared access to the disk drives 1255 is provided by a system area network 1253. However, various mechanisms may alternatively be used to provide shared access.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

As the code is received, the received code may be executed by processor 1204 and/or stored in storage device 1210, or other non-volatile storage for later execution. In this manner, computer system 1200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing access to a resource, the method comprising the computer-implemented steps of:
   sending, from a requestor to a master of the resource, a lock mode request for a lock mode on the resource;
   receiving the resource at the requestor from a holder of the resource, wherein the holder of the resource is separate and distinct from the master of the resource, and wherein the holder is a process that currently holds rights to access the resource by virtue of a lock mode, on the resource, that was previously granted to the holder by the master of the resource; and
   accessing the resource as if the requestor had been granted the lock mode without waiting to receive an express lock mode grant from the master.

2. The method of claim 1, further comprising the computer-implemented steps of:
   detecting that the step of receiving the resource at the requestor has occurred; and
   sending a lock assume message, from the requestor to the master, to inform the master that the requestor has assumed the lock mode relative to the resource.

3. A method for managing access to a resource, the method comprising the computer-implemented steps of:
   receiving, at a holder, an inform lock holder message that a requestor needs the resource, where the holder currently holds the resource and a first lock mode on the resource;
   transferring the resource to the requestor in response to receiving the inform lock holder message without sending a status message to a master of the resource wherein the status message is a down-convert message or a release lock message; and
   updating a lock mode record, maintained by the holder, to indicate that the holder has down-converted from the first lock mode to a second lock mode for the resource.

4. The method of claim 3, further comprising the computer-implemented step of:
   sending an update lock message to the master, wherein the update lock message indicates the second lock mode for the resource.

5. The method of claim 3, further comprising the computer-implemented steps of:
   receiving, at the holder, a message from a sender, wherein the message includes a third lock mode on the resource;
   detecting that the first lock mode and the third lock mode do not match; and sending a lock status message to the sender, wherein the lock status message includes the first lock mode.

6. The method of claim 3, further comprising the computer-implemented steps of:
   receiving, at the holder, a single batched inform lock holder message that contains all information necessary to transfer the resource to a plurality of requestors; and
   transferring the resource to the plurality of requestors.

7. The method of claim 3, further comprising the computer-implemented step of:
   sending a lock access message from the holder to a master.

8. A method for managing access to a resource, the method comprising the computer-implemented steps of:
   receiving, at a master, a request message which indicates that a requestor needs a particular resource of a plurality of resources, where the master maintains a plurality of lock mode records corresponding to the plurality of resources;
   sending, from the master to a holder, an inform lock holder message to indicate to the holder that the requestor needs the particular resource and to identify the requestor to the holder to allow the holder to send the particular resource directly to the requestor;
   receiving a lock access message from the requestor where the lock access message indicates that the requestor has assumed a lock mode relative to the particular resource; and
   performing an update to a particular lock mode record of the plurality of lock mode records in response to receiving the lock access message, wherein the update indicates that the requestor has assumed the lock mode on the particular resource.

9. The method of claim 8, wherein the computer-implemented step of performing an update to a particular lock mode record of the plurality of lock mode records in response to receiving the plurality of lock mode records in response to receiving the lock access message is performed prior to receiving any status message from the holder relating to the particular resource, and wherein the status message is a down-convert message or a release lock message.

10. The method of claim 8, wherein the computer-implemented step of performing an update to a particular lock mode record of the plurality of lock mode records in response to receiving the plurality of lock mode records in response to receiving the lock access message is performed without receiving the status message from the holder relating to the particular resource, and wherein the status message is a down-convert message or a release lock message.

11. The method of claim 8, further comprising the computer-implemented steps of:
    receiving, at the master, a plurality of request messages which indicate that a plurality of requestors need the particular resource; and
    sending from the master to the holder the inform lock holder message, wherein the inform lock holder message contains all information from the plurality of request messages that is necessary for the holder to transfer the particular resource to the plurality of requestors.

12. The method of claim 8, further comprising the computer-implemented steps of:
receiving, at the master, a message from a sender, wherein the message includes a second lock mode on the particular resource;
detecting that the lock mode and the second lock mode do not match; and
sending a lock status message to the sender, wherein the lock status message includes the lock mode.

13. The method of claim 8, further comprising the computer-implemented steps of:
receiving, at the master, a second request message, wherein the request message and the second request message both contain requests for the resource in exclusive lock mode; and
queuing the second request message until the master receives the lock access message from the requestor.

14. A method for managing access to a resource, the method comprising the computer-implemented steps of:
receiving, at a master, a request message which indicates that a requestor needs a particular resource of a plurality of resources, where the master maintains a plurality of lock mode records corresponding to the plurality of resources;
designating one holder out of a plurality of holders wherein the plurality of holders all have respective lock modes for the particular resource;
sending a plurality of broadcast inform lock holder messages, to the plurality of holders except for the one holder, indicating that the requestor needs the particular resource;
receiving a plurality of update lock messages from the plurality of holders except for the one holder, wherein the plurality of update lock messages indicates the respective lock modes of the plurality of holders;
sending, from the master to the one holder, an inform lock holder message to indicate to the one holder that the requestor needs the particular resource;
receiving a lock access message from the requestor where the lock access message indicates that the requestor has assumed a lock mode relative to the particular resource; and
performing an update to a particular lock mode record of the plurality of lock mode records in response to receiving the lock access message without the master receiving a status message from the one holder, wherein the status message is a down-convert message or a release lock message, and wherein the update indicates that the requestor has assumed the lock mode on the particular resource.

15. A computer system, comprising:
a processor;
a computer-readable medium storing instructions of the computer system which, when executed by the processor, cause the processor to perform the computer-implemented steps of:
sending, from a requestor to a master of a resource, a lock mode request for the lock mode on the resource;
receiving the resource at the requestor from a holder of the resource, wherein the holder of the resource is separate and distinct from the master of the resource, and wherein the holder is a process that currently holds rights to access the resource by virtue of a lock mode, on the resource, that was previously granted to the holder by the master of the resource; and
accessing the resource as if the requestor had been granted the lock mode without waiting to receive an express lock mode grant from the master.

16. The computer system of claim 15, wherein the computer-implemented steps further comprise the computer-implemented steps of:
detecting that the step of receiving the resource at the requestor has occurred; and
sending a lock assume message from the requestor to the master to inform the master that the requestor has assumed the lock mode relative to the resource.

17. A computer system, comprising:
a processor;
a computer-readable medium, coupled to the processor, containing:
a particular lock mode record of a plurality of lock mode records corresponding to a lock mode of a particular resource of a plurality of resources, where a master maintains the plurality of lock mode records corresponding to the plurality of resources, wherein the computer-readable medium stores instructions of the computer system which, when executed by the processor, cause the processor to perform the computer-implemented steps of:
receiving, at the master, a request message which indicates that a requestor needs the particular resource of the plurality of resources, where the master maintains the plurality of lock mode records corresponding to the plurality of resources;
sending, from the master to a holder, an inform lock holder message to indicate to the holder that the requestor needs the particular resource and to identify the requestor to the holder to allow the holder to send the particular resource directly to the requestor;
receiving a lock access message from the requestor where the lock access message indicates that the requestor has assumed the lock mode relative to the particular resource; and
performing an update to the particular lock mode record of the plurality of lock mode records in response to receiving the lock access message without receiving a status message, and
wherein the update indicates that the requestor has assumed the lock mode on the particular resource.

18. The computer system of claim 17, wherein the computer-implemented step of performing an update to a particular lock mode record of the plurality of lock mode records in response to receiving the lock access message is performed prior to receiving any status message from the holder relating to the particular resource, and wherein the status message is a down-convert message or a release lock message.

19. The computer system of claim 17, wherein the computer-implemented step of performing an update to a particular lock mode record of the plurality of lock mode records in response to receiving the plurality of lock mode records in response to receiving the lock access message is performed without receiving the status message from the holder relating to the particular resource, and wherein the status message is a down-convert message or a release lock message.

20. The computer system of claim 17, wherein computer-implemented steps further comprise the computer-implemented steps of:
- receiving, at the master, a plurality of request messages which indicate that a plurality of requestors need the particular resource; and
- sending, from the master to the holder, the inform lock holder message, wherein the inform lock holder message contains all information from the plurality of request messages that is necessary for the holder to transfer the particular resource to the plurality of requestors.

21. The computer system of claim 17, wherein the computer-implemented steps further comprise the computer-implemented steps of:
- receiving, at the master, a message from a sender, wherein the message includes a second lock mode on the particular resource;
- detecting that the lock mode and the second lock mode do not match; and
- sending a lock status message to the sender, wherein the lock status message includes the lock mode.

22. The computer system of claim 17, wherein the computer-implemented steps further comprise the computer-implemented steps of:
- receiving, at the master, a second request message wherein the request message and the second request message both contain requests for the resource in exclusive lock mode; and
- queuing the second request message until the master receives the lock access message from the requestor.

23. A computer system, comprising:
a processor;
a computer-readable medium, coupled to the processor, containing:
- a particular lock mode record of a plurality of lock mode records corresponding to a lock mode of a particular resource of a plurality of resources, where a master maintains the plurality of lock mode records corresponding to the plurality of resources, wherein the computer-readable medium stores instructions of the computer system which, when executed by the processor, cause the processor to perform the computer-implemented steps of:
  - receiving, at a master, a request message which indicates that a requestor needs the particular resource of the plurality of resources, where the master maintains the plurality of lock mode records corresponding to the plurality of resources;
  - designating one holder out of a plurality of holders wherein the plurality of holders all have respective lock modes for the particular resource;
  - sending a plurality of broadcast inform lock holder messages, to the plurality of holders except for the one holder, indicating that the requestor needs the particular resource;
  - receiving a plurality of update lock messages from the plurality of holders except for the one holder, wherein the plurality of update lock messages indicates the respective lock modes of the plurality of holders;
  - sending, from the master to the one holder, an inform lock holder message to indicate to the one holder that the requestor needs the particular resource;
  - receiving a lock access message from the requestor where the lock access message indicates that the requestor has assumed the lock mode relative to the particular resource; and
  - performing an update to the particular lock mode record of the plurality of lock mode records in response to receiving the lock access message without the master receiving a status message from the one holder,
  - wherein the status message is a down-convert message or a release lock message, and
  - wherein the update indicates that the requestor has assumed the lock mode on the particular resource.

24. A computer system, comprising:
a processor;
a computer-readable medium, coupled to the processor, containing:
- a resource and a first lock mode on the resource; and
- a lock mode record associated with the resource, wherein the computer-readable medium stores instructions of the computer system which, when executed by the processor, cause the processor to perform the computer-implemented steps of:
  - receiving, at a holder, an inform lock holder message that a requestor needs the resource, wherein the holder currently holds the resource and the first lock mode on the resource;
  - transferring the resource to the requestor in response to receiving the inform lock holder message without sending a status message to a master of the resource wherein the status message is a down-convert message or a release lock message; and
  - updating the lock mode record, maintained by the holder, to indicate that the holder has down-converted from the first lock mode to a second lock mode for the resource.

25. The computer system of claim 24, wherein the computer-implemented steps further comprise the computer-implemented step of:
- sending an update lock message to the master, wherein the update lock message indicates the second lock mode for the resource.

26. The computer system of claim 24, wherein the computer-implemented steps further comprise the computer-implemented steps of:
- receiving, at the holder, a message from a sender, wherein the message includes a third lock mode on the resource;
- detecting that the first lock mode and the third lock mode do not match; and
- sending a lock status message to the sender, wherein the lock status message includes the first lock mode.

27. The computer system of claim 24 wherein the computer-implemented steps further comprise the computer-implemented steps of:
- receiving, at the holder, a single batched inform lock holder message that contains all information necessary to transfer the resource to a plurality of requestors; and
- transferring the resource to the plurality of requestors.

28. A computer-readable medium carrying one or more sequences of instructions for managing access to a resource, wherein execution of the one or more sequences of instructions by one or more processors causes the one or more processors to perform the steps of:
- sending, from a requestor to a master of the resource, a lock mode request for a lock mode on the resource;
- receiving the resource at the requestor from a holder of the resource, wherein the holder of the resource is separate and distinct from the master of the resource, and wherein the holder is a process that currently holds rights to access the resource by virtue of a lock mode, on the resource, that was previously granted to the holder by the master of the resource; and accessing the resource as if the requestor had been granted the lock mode request without waiting to receive an express lock mode grant from the master.

29. The computer-readable medium of claim 28, wherein execution of the one or more sequences of instructions by the one or more processors causes the one or more processors to further perform the steps of:

detecting that the step of receiving the resource at the requestor has occurred; and sending a lock assume message from the requestor to the master to inform the master that the requestor has assumed the lock mode relative to the resource.

30. A computer-readable medium carrying one or more sequences of instructions for managing access to a resource, wherein execution of the one or more sequences of instructions by one or more processors causes the one or more processors to perform the steps of:

receiving, at a holder, an inform lock holder message that a requestor needs the resource, where the holder currently holds the resource and a first lock mode on the resource;

transferring the resource to the requestor in response to receiving the inform lock holder message without sending a status message to a master of the resource wherein the status message is a down-convert message or a release lock message; and updating a lock mode record, maintained by the holder, to indicate that the holder has down-converted from the first lock mode to a second lock mode for the resource.

31. The computer-readable medium of claim 30, wherein execution of the one or more sequences of instructions by the one or more processors causes the one or more processors to further perform the step of:

sending an update lock message to the master, wherein the update lock message indicates the second lock mode for the resource.

32. The computer-readable medium of claim 30, wherein execution of the one or more sequences of instructions by the one or more processors causes the one or more processors to further perform the steps of:

receiving, at the holder, a message from a sender, wherein the message includes a third lock mode on the resource;

detecting that the first lock mode and the third lock mode do not match; and sending a lock status message to the sender, wherein the lock status message includes the first lock mode.

33. The computer-readable medium of claim 30, wherein execution of the one or more sequences of instructions by the one or more processors causes the one or more processors to further perform the steps of:

receiving, at the holder, a single batched inform lock holder message that contains all information necessary to transfer the resource to a plurality of requestors; and transferring the resource to the plurality of requestors.

34. The method for claim 30, wherein execution of the one or more sequences of instructions by the one or more processors causes the one or more processors to further perform the step of:

sending a lock access message from the holder to a master.

35. A computer-readable medium carrying one or more sequences of instructions for managing access to a resource, wherein execution of the one or more sequences of instructions by one or more processors causes the one or more processors to perform the steps of:

receiving, at a master, a request message which indicates that a requestor needs a particular resource of a plurality of resources, wherein the master maintains a plurality of lock mode records corresponding to the plurality of resources;

sending, from the master to a holder, an inform lock holder message to indicate to the holder that the requestor needs the particular resource and to identify the requestor to the holder to allow the holder to send the particular resource directly to the requestor;

receiving a lock access message from the requestor where the lock access message indicates that the requestor has assumed a lock mode relative to the particular resource; and performing an update to a particular lock mode record of the plurality of lock mode records in response to receiving the lock access message, wherein the update indicates that the requestor has assumed the lock mode on the particular resource.

36. The computer-readable medium of claim 35, wherein the step of performing an update to a particular lock mode record of the plurality of lock mode records in response to receiving the lock access message is performed prior to receiving any status message from the holder relating to the particular resource, and wherein the status message is a down-convert message or a release lock message.

37. The computer-readable medium of claim 35, wherein the step of performing an update to a particular lock mode record of the plurality of lock mode records in response to receiving the plurality of lock mode records in response to receiving the lock access message is performed without receiving the status message from the holder relating to the particular resource, and wherein the status message is a down-convert message or a release lock message.

38. The computer-readable medium of claim 35, wherein execution of the one or more sequences of instructions by the one or more processors causes the one or more processors to further perform the steps of:

receiving, at the master, a plurality of request messages which indicate that a plurality of requestors need the particular resource; and sending, from the master to the holder, the inform lock holder message, wherein the inform lock holder message contains all information from the plurality of request messages that is necessary for the holder to transfer the particular resource to the plurality of requestors.

39. The computer-readable medium of claim 35, wherein execution of the one or more sequences of instructions by the one or more processors causes the one or more processors to further perform the steps of:

receiving, at the master, a message from a sender, wherein the message includes a second lock mode on the particular resource;

detecting that the lock mode and the second lock mode do not match; and sending a lock status message to the sender, wherein the lock status message includes the lock mode.

40. The computer-readable medium of claim 35, wherein execution of the one or more sequences of instructions by the one or more processors causes the one or more processors to further perform the steps of:

receiving, at the master, a second request message, wherein the request message and the second request message both contain requests for the resource in exclusive lock mode; and queuing the second request message until the master receives the lock access message from the requestor.

41. A computer-readable medium carrying one or more sequences of instructions for managing access to a resource, wherein execution of the one or more sequences of instructions by one or more processors causes the one or more processors to perform the steps of:

receiving, at a master, a request message which indicates that a requestor needs a particular resource of a plurality of resources, where the master maintains a plurality of lock mode records corresponding to the plurality of resources;

designating one holder out of a plurality of holders wherein the plurality of holders all have respective lock modes for the particular resource;

sending a plurality of broadcast inform lock holder messages, to the plurality of holders except for the one holder, indicating that the requestor needs the particular resource;

receiving a plurality of update lock messages from the plurality of holders except for the one holder, wherein the plurality of update lock messages indicates the respective lock modes of the plurality of holders;

sending, from the master to the one holder, an inform lock holder message to indicate to the one holder that the requestor needs the particular resource;

receiving a lock access message from the requestor where the lock access message indicates that the requestor has assumed a lock mode relative to the particular resource; and performing an update to a particular lock mode record of the plurality of lock mode records in response to receiving the lock access message without the master receiving a status message from the one holder, wherein the status message is a down-convert message or a release lock message, and wherein the update indicates that the requestor has assumed the lock mode on the particular resource.

* * * * *

UNITED STATES PATENT AND TRADEMARK OFFICE
CERTIFICATE OF CORRECTION

PATENT NO. : 7,107,319 B2  Page 1 of 1
APPLICATION NO. : 09/871853
DATED : September 12, 2006
INVENTOR(S) : Sashikanth Chandrasekaran It is certified that error appears in the above-identified patent and that said Letters Patent is hereby corrected as shown below:

On the title page item (73) Assignee:

Delete "Oracle Corporation" and insert --Oracle International Corporation--.

Signed and Sealed this

Twenty Second Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,107,319 B2
APPLICATION NO. : 09/871853
DATED : September 12, 2006
INVENTOR(S) : Sashikanth Chandrasekaran Page 1 of 1

It is certified that error appears in the above-identified patent and that said Letters Patent is hereby corrected as shown below:

Page 2, Col. 1, Item (56) References Cited

OTHER PUBLICATIONS

Please insert

--Lory D. Molesky et al., "Database Locking Protocols for Large-Scale Cache-Coherent Shared Memory Multiprocessors: Design, Implementation and Performance," June 6, 1995, pages 1-24.

Lory D. Molesky et al., "Efficient Locking for Shared Memory Database Systems," March 1994, 28 pages.--

Signed and Sealed this

Seventeenth Day of February, 2009

JOHN DOLL
*Acting Director of the United States Patent and Trademark Office*